United States Patent
Chu et al.

(10) Patent No.: US 12,008,821 B2
(45) Date of Patent: Jun. 11, 2024

(54) MACHINE-LEARNED MODELS FOR UNSUPERVISED IMAGE TRANSFORMATION AND RETRIEVAL

(71) Applicant: Google LLC, Mountain View, CA (US)

(72) Inventors: Wen-Sheng Chu, Santa Clara, CA (US); Abhishek Kumar, Milpitas, CA (US); Min Jin Chong, Singapore (SG)

(73) Assignee: GOOGLE LLC, Mountain View, CA (US)

( * ) Notice: Subject to any disclaimer, the term of this patent is extended or adjusted under 35 U.S.C. 154(b) by 444 days.

(21) Appl. No.: 17/314,738

(22) Filed: May 7, 2021

(65) Prior Publication Data

US 2022/0374625 A1 Nov. 24, 2022

(51) Int. Cl.
*G06K 9/00* (2022.01)
*G06F 18/214* (2023.01)
(Continued)

(52) U.S. Cl.
CPC ............ *G06V 20/64* (2022.01); *G06F 18/214* (2023.01); *G06F 18/23* (2023.01); *G06N 3/08* (2013.01);
(Continued)

(58) Field of Classification Search
CPC .... G06V 20/64; G06V 40/103; G06V 40/171; G06V 10/454; G06V 10/82;
(Continued)

(56) References Cited

U.S. PATENT DOCUMENTS 10,861,213 B1 * 12/2020 Holzer ............... G06N 3/08
11,580,395 B2 * 2/2023 Karras ............... G06N 3/08
(Continued)

FOREIGN PATENT DOCUMENTS

| CN | 110830848 A | * | 2/2020 | ............ G06N 3/08 |
| CN | 111915693 B | * | 10/2023 | ............ G06N 3/045 |
| WO | WO 2021/017113 | | 2/2021 | |

OTHER PUBLICATIONS

International Search Report and Written Opinion for Application No. PCT/US2022/028160, dated Jul. 29, 2022, 17 pages.
(Continued)

*Primary Examiner* — Shervin K Nakhjavan
(74) *Attorney, Agent, or Firm* — DORITY & MANNING P.A.

(57) ABSTRACT

Systems and methods of the present disclosure are directed to a computer-implemented method. The method can include obtaining a first image depicting a first object and a second image depicting a second object, wherein the first object comprises a first feature set and the second object comprises a second feature set. The method can include processing the first image with a machine-learned image transformation model comprising a plurality of model channels to obtain a first channel mapping indicative of a mapping between the plurality of model channels and the first feature set. The method can include processing the second image with the model to obtain a second channel mapping indicative of a mapping between the plurality of model channels and the second feature set. The method can include generating an interpolation vector for a selected feature.

18 Claims, 11 Drawing Sheets

(51) Int. Cl.
| | |
|---|---|
| *G06F 18/23* | (2023.01) |
| *G06N 3/08* | (2023.01) |
| *G06N 20/00* | (2019.01) |
| *G06T 7/73* | (2017.01) |
| *G06V 20/64* | (2022.01) |
| *G06V 40/10* | (2022.01) |
| *G06V 40/16* | (2022.01) |

(52) U.S. Cl.
CPC ............... *G06N 20/00* (2019.01); *G06T 7/73* (2017.01); *G06V 40/103* (2022.01); *G06V 40/171* (2022.01)

(58) Field of Classification Search
CPC ......... G06F 18/214; G06F 18/23; G06N 3/08; G06N 20/00; G06N 3/045; G06N 3/047; G06N 3/084; G06N 3/088; G06N 20/10; G06T 7/73
See application file for complete search history.

(56) References Cited

U.S. PATENT DOCUMENTS

| | | | | |
|---|---|---|---|---|
| 11,640,684 | B2* | 5/2023 | Abdal .................... | G06N 3/045 |
| | | | | 382/156 |
| 11,809,520 | B1* | 11/2023 | D'Innocente ........ | G06N 3/0464 |
| 2011/0091113 | A1* | 4/2011 | Ito ......................... | G06T 3/0093 |
| | | | | 382/197 |
| 2020/0265219 | A1* | 8/2020 | Liu ....................... | G06F 18/214 |
| 2020/0265239 | A1* | 8/2020 | Guo ....................... | G06V 20/46 |
| 2020/0402284 | A1* | 12/2020 | Saragih .................. | G06V 10/82 |
| 2021/0150197 | A1* | 5/2021 | Kokkinos .............. | G06V 10/74 |
| 2021/0192186 | A1* | 6/2021 | Kim ...................... | G06V 40/165 |
| 2021/0209388 | A1* | 7/2021 | Ciftci ..................... | G06N 3/08 |
| 2021/0248355 | A1* | 8/2021 | Wang ...................... | G06T 7/73 |
| 2021/0248853 | A1* | 8/2021 | Balassanian .......... | G10H 1/0066 |
| 2021/0264236 | A1* | 8/2021 | Xu ......................... | G06N 3/045 |
| 2021/0279852 | A1* | 9/2021 | Jakka .................... | H04N 23/631 |
| 2021/0279950 | A1* | 9/2021 | Phalak ..................... | G06T 7/55 |
| 2021/0281814 | A1* | 9/2021 | Guizilini ................ | H04N 23/60 |
| 2021/0327038 | A1* | 10/2021 | Helminger .............. | G06T 9/002 |
| 2021/0327431 | A1* | 10/2021 | Stewart .................. | G06V 40/45 |
| 2021/0358177 | A1* | 11/2021 | Park ........................ | G06N 3/08 |
| 2022/0058420 | A1* | 2/2022 | Peng ....................... | G06V 10/82 |
| 2022/0148184 | A1* | 5/2022 | Biswas .................. | G06N 20/00 |
| 2022/0153262 | A1* | 5/2022 | Gallo ...................... | G01S 7/417 |
| 2022/0156530 | A1* | 5/2022 | Tiong .................... | G06V 10/454 |
| 2022/0198830 | A1* | 6/2022 | Li ........................... | G06F 18/24133 |
| 2023/0087526 | A1* | 3/2023 | Huang .................... | G06F 18/245 |
| | | | | 382/156 |
| 2023/0095182 | A1* | 3/2023 | Yao .......................... | G06T 3/40 |
| | | | | 382/115 |
| 2023/0144209 | A1* | 5/2023 | Cai ........................ | G06V 20/588 |
| | | | | 348/148 |
| 2023/0214976 | A1* | 7/2023 | Wu .......................... | G06T 5/002 |
| | | | | 382/157 |
| 2023/0252662 | A1* | 8/2023 | Nikitidis ................ | G06V 40/16 |
| | | | | 382/103 |

OTHER PUBLICATIONS

International Preliminary Report on Patentability for Application No. PCT/US2022/028160, dated Nov. 16, 2023, 11 pages.
Abdal et al., "Image2StyleGAN: How to Embed Images Into the StyleGAN Latent Space?", arXiv:1904.03189v1, 21 pages.
Abdal et al., "Image2StyleGAN++: How to Edit the Embedded Images?", arXiv:1911.11544v2, 18 pages.
Bao et al., "Towards Open-Set Identity Preserving Face Synthesis", arXiv:1803.11182v2, 10 pages.
Bartlett et al., "Typicality and familiarity of faces"., Memory & Cognition, vol. 12, 1984, pp. 219-228.
Bau et al., "GAN Dissection: Visualizing and Understanding Generative Adversarial Networks", arXiv:1811.10597v2, 18 pages.
Brock et al., "Large Scale GAN Training For High Fidelity Natural Image Synthesis", arXiv:1809.1109v1, 29 pages.
Buchta et al., "Spherical k-Means Clustering", Journal of Statistical Software, vol. 50, No. 10, 2012.
Choi et al., "StarGAN: Unified Generative Adversarial Networks for Multi-Domain Image-to-Image Translation", arXiv:1711.09020v3, 15 pages.
Chong et al., "Effectively Unbiased FID and Inception Score and where to find them", arXiv:1911.07023v3, 12 pages.
Chong et al., "Retrieve in Style: Unsupervised Facial Feature Transfer and Retrieval", arXiv:2107.06256v3, 15 pages.
Collins et al., "Editing in Style: Uncovering the Local Semantics of GANs", arXiv:2004.14367v2, 23 pages.
Courtois et al., "Target and distractor typicality in facial recognition?", Journal of Applied Psychology, vol. 66, No. 5, 1981, pp. 639-645.
Gu et al., "Mask-Guided Portrait Editing with Conditional GANs", IEEE/CVF Conference on Computer Vision and Pattern Recognition (CVPR), Jun. 15-20, 2019, Long Beach, California, pp. 3436-3445.
Harkonen et al., "GANSpace: Discovering Interpretable GAN Controls", arXiv: 2004.02546v1, 14 pages.
He et al., "AttGAN: Facial Attribute Editing by Only Changing What You Want", arXiv:1711.10678v3, 16 pages.
Huang et al., "Arbitrary Style Transfer in Real-time with Adaptive Instance Normalization", arXiv:1703.06868v2, 11 pages.
Jahanian et al., "On the "steerability" of generative adversarial networks", arXiv:1907.07171v4, 31 pages.
Karras et al., "Progressive Growing of GANS for Improved Quality, Stability, and Variation", arXiv:1710.10196v1, 25 pages.
Karras et al., "A Style-Based Generator Architecture for Generative Adversarial Networks", arXiv:1812.04948v3, 12 pages.
Karras et al., "Analyzing and Improving the Image Quality of StyleGAN", arXiv:1912.04958v2, 21 pages.
Kowalski et al., "CONFIG: Controllable Neural Face Image Generation", arXiv:2005.02671v3, 28 pages.
Lample et al., "Fader Networks: Manipulating Images by Sliding Attributes", arXiv:1706.00409v1, 10 pages.
Lee et al., "MaskGAN: Towards Diverse and Interactive Facial Image Manipulation", arXiv:1907.11922v2, 20 pages.
Lee et al., "Suspect identification by facial features", Ergonomics, vol. 47, No. 7, 2004, pp. 719-747.
Liu et al., "Deep Learning Face Attributes in the Wild", arXiv:1411.7766v3, 11 pages.
Megreya et al., "Matching Faces to Photographs: Poor Performance in Eyewitness Memory (Without the Memory)", Journal of Experimental Psychology: Applied, vol. 14, No. 4, 2008, pp. 364-372.
Natsume et al., "RSGAN: Face Swapping and Editing Using Face and Hair Representation in Latent Spaces", arXiv:1804.03447v2, 26 pages.
Pentland et al., "Photobook: Content-based manipulation of image databases", International Journal of Computer Vision, vol. 18, 1996, pp. 233-254.
Pumarola et al., "GANimation: Anatomically-aware Facial Animation from a Single Image", ECCV: European Conference on Computer Vision, Sep. 8-14, 2018, Munich Germany, pp. 818-833.
Radford et al., "Unsupervised Representation Learning with Deep Convolutional Generative Adversarial Networks", arXiv:1511.06434v1, 15 pages.
Richardson et al., "Encoding in Style: a StyleGAN Encoder for Image-to-Image Translation", arXiv:2008.00951v1, 16 pages.
Schroff et al., "FaceNet: A Unified Embedding for Face Recognition and Clustering", arXiv:1503.03832v3, 10 pages.
Shen et al., "Interpreting the Latent Space of GANs for Semantic Face Editing", arXiv:1907.10786v3, 12 pages.
Shen et al., "Closed-Form Factorization of Latent Semantics in GANs", arXiv:2007.06600v3, 9 pages.
Sun et al., "Deeply learned face representations are sparse, selective, and robust", IEEE Conference on Computer Vision and Pattern Recognition (CVPR), Jun. 7-12, 2015, Boston, Massachusetts, pp. 2892-2900.
Suzuki et al., "Spatially Controllable Image Synthesis with Internal Representation Collaging", arXiv:1811.10153v2, 14 pages.

(56) References Cited

OTHER PUBLICATIONS

Taigman et al., "DeepFace: Closing the Gap to Human-Level Performance in Face Verification", IEEE Conference on Computer Vision and Pattern Recognition, Sep. 25, 2014, Columbus, Ohio, pp. 1701-1708.
Tewari et al., "StyleRig: Rigging StyleGAN for 3D Control over Portrait Images", arXiv:2004.00121v2, 13 pages.
Turk et al., "Eigenfaces for Recognition", Journal of Cognitive Neuroscience, vol. 3, No. 1, 1991, pp. 71-86.
Usman et al., "PuppetGAN: Cross-Domain Image Manipulation by Demonstration", IEEE/CVF International Conference on Computer Vision (ICCV), Nov. 26, 2019, Seoul, Korea, pp. 9450-9458.
Voynov et al., "Unsupervised Discovery of Interpretable Directions in the GAN Latent Space", arXiv:2002.03754v3, 15 pages.
Wu et al., "Institutional Knowledge at Singapore Management University", first ACM international conference on Multimedia, Aug. 2-6, 1993, Anaheim, California, pp. 47-55.
Wulff et al., "Improving Inversion and Generation Diversity in StyleGAN using a Gaussianized Latent Space", arXiv:2009.06529v1, 16 pages.
Xiao et al., "ELEGANT: Exchanging Latent Encodings with GAN for Transferring Multiple Face Attributes", European Conference on Computer Vision (ECCV), Sep. 8-14, 2018, Munich, Germany, pp. 168-184.
Xu et al., "Generative Hierarchical Features from Synthesizing Images", arXiv:2007.10379v1, 15 pages.
Yin et al., "Towards Large-Pose Face Frontalization in the Wild", arXiv:1704.06244v3, 10 pages.
Zhang et al., "Generative Adversarial Network with Special Attention for Face Attribute Editing", European Conference on Computer Vision (ECCV), Sep. 8-14, 2018, Munich, Germany, pp. 417-432.
Zhu et al., "In-Domain GAN Inversion for Real Image Editing", arXiv:2004.00049v3, 31 pages.

\* cited by examiner

MACHINE-LEARNED MODELS FOR UNSUPERVISED IMAGE TRANSFORMATION AND RETRIEVAL

FIELD

The present disclosure relates generally to image transformation and retrieval. More particularly, the present disclosure relates to machine-learned models for image transformation and retrieval in an unsupervised fashion.

BACKGROUND

Recent advancements in machine learning have allowed for the generation of realistic high resolution images, particularly for certain types of entities (e.g., faces, etc.). However, the outputs of these machine-learned models are generally considered to be difficult or impossible to control. More particularly, fine-tuned control of specific features of a transformed entity (e.g., eyes, mouth, nose, pose, etc.) generally necessitates in-depth annotation of training datasets to a degree of specificity that is prohibitively difficult. As such, machine-learned models capable of unsupervised, fine-tuned transformation of specific features are desired.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generation of interpolation vectors for image transformation and retrieval tasks. The method can include obtaining, by a computing system comprising one or more computing devices, a first image depicting a first object of an object type and a second image depicting a second object of the object type, wherein objects of the object type comprise a plurality of object features, and wherein the first object comprises a first feature set for the plurality of object features and the second object comprises a second feature set for the plurality of object features different than the first feature set. The method can include processing, by the computing system, the first image with a machine-learned image transformation model comprising a plurality of model channels to obtain a first channel mapping indicative of a mapping between the plurality of model channels and the first feature set for the plurality of object features. The method can include processing, by the computing system, the second image with the machine-learned image transformation model to obtain a second channel mapping indicative of a mapping between the plurality of model channels and the second feature set for the plurality of object features. The method can include generating, by the computing system based at least in part on the first channel mapping and the second channel mapping, an interpolation vector for a selected feature of the plurality of object features. Another aspect of the present disclosure is directed to A computing system for generation of interpolation vectors for image transformation and retrieval tasks. The computing system can include one or more processors. The computing system can include a machine-learned image transformation model trained to perform image transformation tasks, wherein the machine-learned image transformation model comprises an encoding portion, a decoding portion, and a plurality of model channels. The computing system can include one or more tangible, non-transitory, computer readable media that collectively store instructions that when executed by the one or more processors cause the one or more processors to perform operations. The operations can include obtaining a first image depicting a first object of an object type and a second image depicting a second object of the object type, wherein objects of the object type comprise a plurality of object features, and wherein the first object comprises a first feature set for the plurality of object features and the second object comprises a second feature set for the plurality of object features different than the first feature set. The operations can include processing the first image with the encoding portion of the machine-learned image transformation model to obtain a first channel mapping indicative of a mapping between the plurality of model channels and the first feature set for the plurality of object features. The operations can include processing the second image with the encoding portion of the machine-learned image transformation model to obtain a second channel mapping indicative of a mapping between the plurality of model channels and the second feature set for the plurality of object features. The operations can include generating, based at least in part on the first channel mapping and the second channel mapping, an interpolation vector for a selected feature of the plurality of object features.

Another aspect of the present disclosure is directed to One or more tangible, non-transitory, computer readable media that collectively store instructions that when executed by one or more processors cause the one or more processors to perform operations. The operations can include obtaining a first image depicting a first object of an object type and a second image depicting a second object of the object type, wherein objects of the object type comprise a plurality of object features, and wherein the first object comprises a first feature set for the plurality of object features and the second object comprises a second feature set for the plurality of object features different than the first feature set. The operations can include processing the first image with a machine-learned image transformation model to obtain a first channel mapping indicative of a mapping between the plurality of model channels and the first feature set for the plurality of object features. The operations can include processing the second image with the machine-learned image transformation model to obtain a second channel mapping indicative of a mapping between the plurality of model channels and the second feature set for the plurality of object features. The operations can include generating, based at least in part on the first channel mapping and the second channel mapping, an interpolation vector for a selected feature of the plurality of object features.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
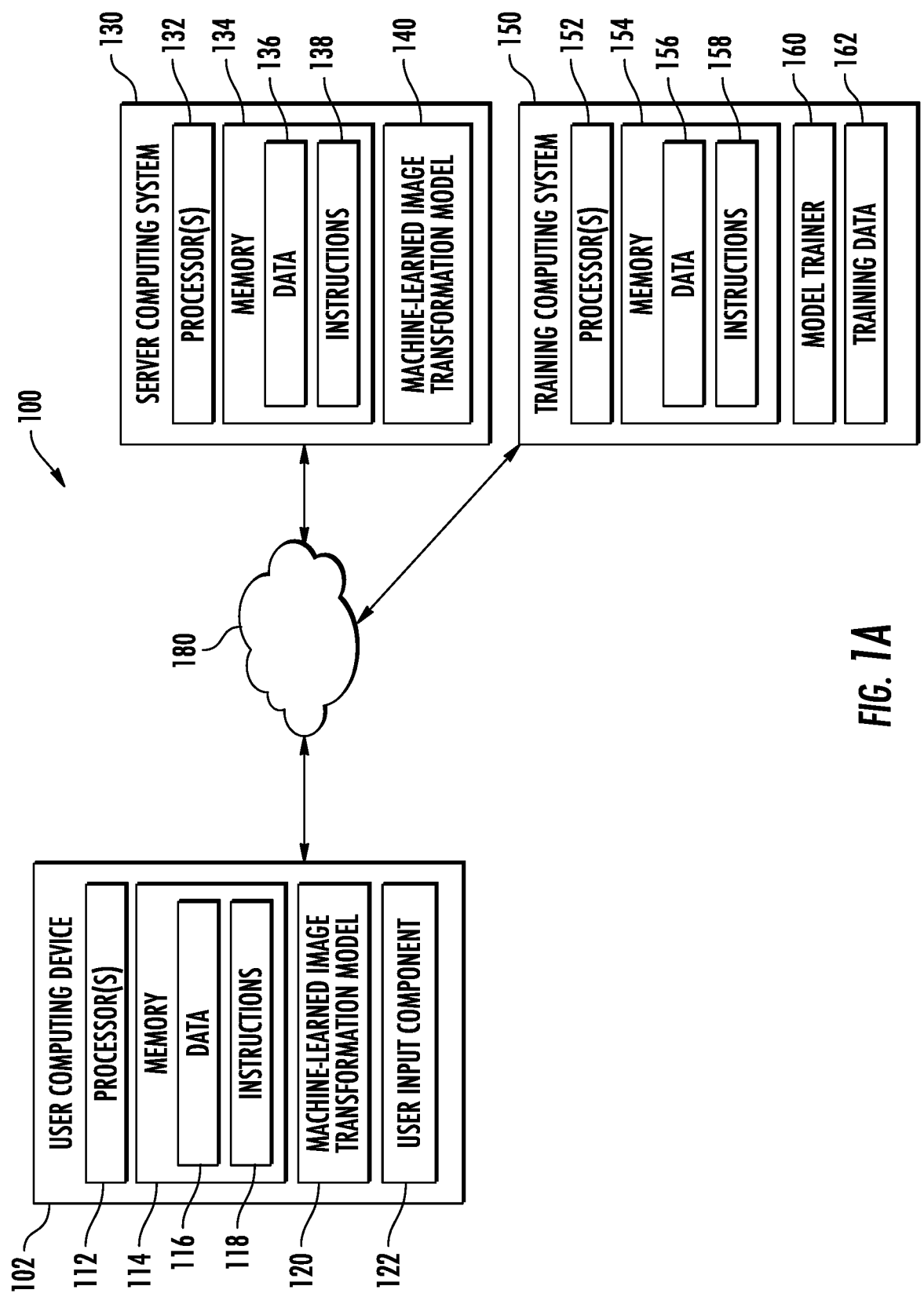
FIG. 1A depicts a block diagram of an example computing system that performs image transformation and/or image retrieval according to example embodiments of the present disclosure.

Reference numerals that are repeated across plural figures are intended to identify the same features in various implementations.

DETAILED DESCRIPTION

Overview

Generally, the present disclosure is directed to image transformation and retrieval. More particularly, the present disclosure relates to machine-learned models for image transformation and retrieval in an unsupervised fashion. As an example, a first image and a second image can be obtained. The first and second images can respectively depict a first object and a second object (e.g., a first face and a second face, etc.). The first and second objects can be of an object type (e.g., a human face object type, etc.), which can include a plurality of object features (e.g., eye features, nose features, mouth features, pose, etc.). The first and second images can be processed with a machine-learned image transformation model that includes a plurality of model channels (e.g., a pre-trained image transformation model, etc.). By processing the first and second images, first and second channel mappings can be obtained. The first channel mapping can indicate a mapping between the model channels and the first object features, and the second channel mapping can indicate a mapping between the model channels and the second object features. Based on the first and second channel mappings, an interpolation vector can be generated for a selected feature of the plurality of object features (e.g., a vector for a nose feature of a face object, etc.). In some implementations, the interpolation vector can be configured to interpolate the selected feature from the first image to the selected feature of the second image (e.g., interpolating the nose feature from the face of the first image to the face of the second image, etc.). Additionally, or alternatively, in some implementations the interpolation vector can be configured to indicate a similarity between the selected feature from the first object and the selected feature from the second object (e.g., indicating a similarity between the nose of the first face and the nose of the second face, etc.). In such fashion, the interpolation vector can be generated for selective, fine-grained image transformation and/or retrieval without necessitating the complex annotation of training datasets.

More particularly, a first image and a second image can be obtained. The first image can depict a first object of an object type (e.g., a human face, a room that includes furniture, a vehicle, etc.), and the second image can depict a second object of the object type. As an example, the first object may be a first face of a human face object type and the second object can be a second human face of the human face object type. As another example, the first object may be a pickup truck of a vehicle object type and the second object may be a sedan of the vehicle object type. The object type can include a plurality of object features. As an example, a human face object type can include a plurality of facial features (e.g., eye feature(s), nose feature(s), mouth feature(s), feature(s) for a region including a portion of the face, hair feature(s), pose feature(s), head shape feature(s), etc.). As another example, a vehicle object type can include a plurality of vehicular features (e.g., roof feature(s), wheel feature(s), vehicle shape feature(s), cabin feature(s), etc.). As another example, a room object type can include a plurality of room features (e.g., furniture objects feature(s), wall feature(s), accessory feature(s), paint feature(s), etc.). As yet another example, a human body object type can include a plurality of body features (e.g., body composition feature(s), body shape feature(s), clothing items feature(s), facial feature(s), pose feature(s), etc.). As such, it should be broadly understood that the object type can be any sort of object, and can include any manner of object features that correspond to the object type.

The first image can be processed with a machine-learned image transformation model. The machine-learned image transformation model can include a plurality of model channels. As an example, the machine-learned image transformation model may include a plurality of channels that are respectively configured to detect a feature of the plurality of object features. For example, the object can be a human face object that includes a nose feature, an eyes feature, and a mouth feature. The machine-learned image transformation model can include a channel configured to detect nose features, a channel configured to detect eyes features, and a channel configured to detect mouth features. By processing the first image, a first channel mapping can be obtained that is indicative of a mapping between the plurality of model channels and the first feature set for the plurality of object features. As an example, the first channel mapping can indicate that two channels from the plurality of model channels are mapped to a nose feature of the first feature set, while three other model channels the plurality of model channels are mapped to a pose feature of the first feature set.

Alternatively, in some implementations, each model channel of the plurality of model channels can be mapped to a single respective feature of the plurality of features As a more particular example, conventional transformation models generally assume that the channels of models that make high contributions for particular feature(s) are always the same for each image that includes an object of a specific object type. For example, conventional models assume that for each image including a human face, the channels that contribute to the eyes feature(s) of the face will be the same for each image of a face. Based on this assumption, conventional models generally generate channel contribution scores for a large collection of images N, and then average the scores. However, this conventional method ignores the significant variance in high contribution channels between images. More particularly, averaging contribution scores over a large number of images N can destroy feature aspects that are specific to source images and reference images, therefore significantly reducing the quality of image transformations, while also necessitating the significantly inefficient processing of the large number of images N. As such, systems and methods of the present disclosure instead process a source image (e.g., the first image, etc.), and a reference image (e.g., the second image, etc.), therefore avoiding the computational inefficiencies and reduction in quality inherent to conventional image transformation techniques.

More particularly, it can be assumed that performance of k-means clustering over a specific feature of a plurality of images of the same object type (e.g., clustering over hair $M_{hair}$ (N=1) for images that depict a human face object type, etc.) can lead to semantically meaningful clusters of images. As such, it can also be assumed that the top active model channels for each image cluster are unique to the feature associated with the image cluster. Therefore, high contribution model channels for a specific semantic feature are not common across images, and instead can include multiple rich semantic meanings. More particularly, within each feature k, there can be multiple subgroups that each image can belong to. As such, unlike conventional models which process a large number of images N and average contribution scores, systems and methods of the present disclosure can facilitate more accurate, more efficient, and more realistic image transformation and/or retrieval by processing channel mappings for only the source image and the reference image N=2 (e.g., the first image, the second image, etc.).

As an example, the machine-learned image transformation model can process the first image (e.g., a reference image r, etc.) to obtain first channel mapping $\Sigma_{h,w} A[r]_{c,h,w}^2 \odot U[r]_{k,h,w}$, where $A \in \mathbb{R}^{C \times H \times W}$ can be the activation tensor at a particular layer of the machine-learned image transformation model, and C can represent the number of channels, H can represent the height, and W can represent the width. Additionally, each spatial location of A can be associated with cluster memberships $U \in \{0,1\}^{K \times H \times W}$. Intuitively, the first channel mapping can indicate how much the c-th channel of style coefficients $\sigma \in \mathbb{R}^C$ can contribute to the generation for a certain feature k of the first feature set of the plurality of object features. It should be noted that in some implementations, σ can directly scale the activations A in the modulation module, thus, the larger the activations, the more k is affected by the channel c.

Additionally, the machine-learned image transformation model can process the second image (e.g., a source image s, etc.) to obtain second channel mapping $\Sigma_{h,w} A[s]_{c,h,w}^2 \odot U[s]_{k,h,w}$, which can be represented in the same manner as previously discussed with regards to the first channel mapping, and can be indicative of a mapping between the plurality of model channels and the second feature set for the plurality of object features. More particularly, the second channel mapping can indicate how much the c-th channel of style coefficients $\sigma \in \mathbb{R}^C$ can contribute to the generation for a certain feature k of the second feature set of the plurality of object features.

An interpolation vector for a selected feature of the plurality of object features can be generated based at least in part on the first channel mapping and the second feature mapping. More particularly, in some implementations, an additional channel mapping can be determined based on the first channel mapping and the second channel mapping as represented by:

$$M_{k,c} = \max\left(\sum_{h,w} A[s]_{c,h,w}^2 \odot U[s]_{k,h,w}, \sum_{h,w} A[r]_{c,h,w}^2 \odot U[r]_{k,h,w}\right)$$

Where $M_{k,c}$ can represent the additional channel mapping. In some implementations, each channel of the plurality of model channels can correspond to a respective object feature of the plurality of object features. A soft class assignment for each feature channel can be obtained based on a softmax of all features, as represented by:

$$q = \text{Softmax}_k\left(\frac{M}{\tau}\right),$$

where $M \in [0,1]^{K \times C}$ can represent the stacked contribution score of all of the plurality of object features, τ can represent the temperature, and $q \in [0,1]^{K \times C}$ can represent the interpolation vector. The interpolation vector for a particular feature k, $q_k$ can be indexed from the row of q. As such, in some implementations, the generated interpolation vector $q \in [0, 1]^{K \times c}$ can include a separate interpolation vector $q_k$ for each object feature k of the plurality of object features K. Alternatively, in some implementations, the interpolation vector can be generated as $q_k$ for a selected feature k of the plurality of object features K.

In some implementations, the interpolation vector can be configured to interpolate the selected feature of the plurality of object features from the first feature set for the plurality of object features to the second feature set for the plurality of object features. To follow the previous examples, the interpolation vector $q_k$ can be generated for a specific feature k. The interpolation vector $q_k$ can then be utilized as a mask for k that allows interpolation between the first feature set $\sigma^R$ and the second feature set $\sigma^S$. In some implementations, the interpolation vector $q_k$ can can be utilized to interpolate the selected feature from the first feature set to the second feature set by processing the first image, the second image, and the interpolation vector with the machine-learned image transformation model to obtain an interpolated image. The interpolated image can depict a third object of the object type that includes a third feature set for the plurality of object features. The third feature set can include the selected feature from the first feature set and one or more features from the second feature set. To follow the previously described example, the third image $\sigma_k^G$ can be obtained by processing the first image (e.g., the first feature set $\sigma^R$, etc.), the second image (e.g., the second feature set $\sigma^S$, etc.) and the interpolation vector $q_k$ with the machine-learned image transformation model as represented by:

$$\sigma_k^G = (1-q_k) \odot \sigma^S + q_k \odot \sigma^S$$

In some implementations, the object type can be a human face object type, and the selected feature can be a pose feature. As an example, the first image (e.g., the reference image, etc.) can depict a human face at a pose in which the face is looking to the left side of the image, and the second image (e.g., the source image, etc.) can depict a human face at a pose in which the face is looking to the right side of the image. The interpolation vector can map the model channel(s) of the machine-learned image transformation model that correspond to the pose feature. For example, the interpolation vector may map the first 4 layers of the machine-learned image transformation model (e.g., 2048 style coefficient channels, etc.) to the pose feature $q_{pose}$ and a hair feature $q_{hair}$. For these 4 layers, data for the pose feature can be derived as represented by:

$$q_{pose} = 1 - q_{hair}$$

for the first 4 layers, while the rest of the model channels of the machine-learned image transformation model are zeroed out or otherwise ignored. In such fashion, the pose feature of the first feature set (e.g., the reference image) can be interpolated to be the pose feature of the second feature set without interpolation of any other features of the first feature set to generate a third image that depicts a third object. The third object can include the pose of the first feature set (e.g., looking to the left side of the image) instead of the pose of the second feature set (e.g., looking to the right side of the image, etc.) while maintaining the other features of the second feature set for the plurality of object features (e.g., eye features, mouth features, nose features, etc.).

Similarly, data for a feature different than the pose feature can be derived in the same manner. To follow the previous example, to derive the data for the feature, the model channels of the first 4 layer(s) mapped to the hair and pose features can be zeroed out or otherwise ignored. It should be noted that by transferring pose feature(s) using the interpolation vector, systems and methods of the present disclosure obviate the need for data labeling or manual tuning of parameters and/or hyperparameters; processes that are required by conventional image transformation techniques for pose interpolation. As such, the systems and methods of the present disclosure represent a significant increase in efficiency in comparison to conventional methods, and furthermore substantially reduce the computational resources required to facilitate pose transfer for image transformation (e.g., processing cycles, memory, storage, power, etc.).

In some implementations, the interpolation vector can be configured to be indicative of a similarity between the selected feature from the first feature set and the selected feature from the second feature set (e.g., a similarity between a hair feature of the first feature set and the hair feature of the second feature set, etc.). For example, given a retrieval dataset $\mathcal{X}$, the interpolation vector can be utilized to retrieve the top-k closest images $\mathcal{T}_k \subset \mathcal{X}$ with respect to a facial feature (e.g., eye features, etc.). As described previously, the first channel mapping and second channel mapping can be utilized to identify the channels that mediate the various features of a specific object type. As such, the channel mappings, and/or the interpolation vector, can be utilized to retrieve images that depict objects with features (e.g., appearance, etc.) that are similar to the features of the interpolation vector and/or the channel mappings.

As an example, given a feature k, $q_k \in [0,1]^{1 \times C}$ can be encoded, for a particular image, how much that channel contributes to that feature. Since $q_k$ can be considered to be a mask, a feature specific representation can be constructed as represented by:

$$v_k^Q = q_k^Q \odot \sigma^Q.$$

where feature retrieval can be performed by matching $v_k$, as two images with similar $v_k$ suggest a lookalike feature k.

In some implementations, the interpolation of features from the first feature set to the second feature set using the interpolation vector can be formulated as a latent direction. More particularly, the formulation as a latent direction can be formulated as:

$$\sigma_k^G = \sigma^S + \alpha q_k \odot (\sigma^R - \sigma^S)$$

where the latent direction can be represented as $n = q_k \odot (\sigma^R - \sigma^S)$ and the scalar step can be represented as $\alpha$. In some implementations, if scalar step $\alpha$ is restricted such that $\alpha \in [0,1]$, a style interpolation will be performed. More particularly, under the property of vector arithmetic, $\alpha \in R$ can be utilized to allow for style extrapolation (e.g., smooth pose interpolation, etc.).

In some implementations, a plurality of additional images can be obtained. Each of the plurality of images can depict a respective plurality of objects of the object type. Additionally, each of the additional can include a feature set for the plurality of object features. For each of the plurality of additional images, a respective additional image can be processed with the machine-learned image transformation model to obtain a respective channel mapping. The respective channel mapping can be indicative of a mapping between the plurality of model channels and the feature set of the respective additional image.

In some implementations, for each of the plurality of additional images, an additional interpolation vector can be generated based at least in part on the first channel mapping and the respective channel mapping. More particularly, the representations $v_k^R = q_k^R \odot \sigma^R$ can be computed where $\sigma^R \in \Sigma$ and $\Sigma$ are the style coefficients for the images of the plurality of additional images $\mathcal{X}$. The distance between the features of the two images (e.g., the first image, the second image, the respective additional image, etc.) can be defined as:

$$\text{Distance}_k(I^Q, I^R) = d(v_k^Q, v_k^R)$$

where d can represent a distance metric. The distances can be ranked for nearest neighbor search for facial feature k. For example, if there is a $M_k$ and consequently, a $q_k$ mismatch between two images, their distance will be large. As discussed previously, similar features can generally express similar $M_k$. As such, it follows that smaller distance under the distance metric d will reflect more similar features. In some implementations, interpolation vector and/or query image $\sigma^Q$ and retrieved image $\sigma^R$ can be normalized using layer-wise mean and standard deviation from $\Sigma$. In some implementations, the first image, the second image, and the plurality of additional images can be clustered based at least in part on the interpolation vector and each of the additional interpolation vectors.

In some implementations, the machine-learned image transformation model can include multiple model portions. As an example, the machine-learned image transformation model can include an encoding portion, a decoding portion, and a discriminator portion (e.g., a generative adversarial network (GAN), etc.). For example, in some implementations, the encoding portion can be configured to encode an image, and the first image can be processed with the encoding portion of the machine-learned image transformation model to obtain the first channel mapping indicative of the mapping between the model channels and the first feature set for the plurality of object features. Similarly, in some implementations, the decoding portion of the machine-learned image transformation model can be configured to process an encoding of an image (e.g., and/or an interpolation vector, etc.) to generate the third image. Additionally, or alternatively, in some implementations, the machine-learned image transformation model can be or otherwise include one or more neural networks pre-trained for image transformation tasks. For example, the machine-learned image transformation model can be or otherwise include a generative adversarial network for realistic image transformation.

Systems and methods of the present disclosure provide a number of technical effects and benefits. As one example technical effect and benefit, the systems and methods of the present disclosure enable a significant advancement in image transformation quality and efficiency in comparison to other approaches. As an example, conventional image transformation techniques (e.g., interpolation of feature(s) from a first image to a second, etc.) operate by processing a large number of images N that depict objects of the same object type to obtain a respective number N of channel contribution scores, and then averaging the channel contribution scores. However, the processing of this large number of images N presents a significant cost in computational resources (e.g., processor cycles, memory, storage, power, etc.). Additionally, by averaging the contribution scores, this conventional approach ignores that channel contributions for a particular object feature can vary substantially between images, which can destroy the specific effects unique to source and/or reference images and therefore significantly reduce the quality of the image transformation. As such, systems and methods of the present disclosure determine channel mappings only for the source image and the reference image, therefore significantly reducing the utilization of computational resources, while also significantly increasing the quality of the image transformation.

With reference now to the Figures, example embodiments of the present disclosure will be discussed in further detail.

Example Devices and Systems

FIG. 1A depicts a block diagram of an example computing system 100 that performs image transformation and/or image retrieval according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned image transformation models 120. For example, the machine-learned image transformation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned image transformation models 120 are discussed with reference to FIGS. 2-4C.

In some implementations, the one or more machine-learned image transformation models 120 can be received from the server computing system 130 over network 180, stored in the user computing device memory 114, and then used or otherwise implemented by the one or more processors 112. In some implementations, the user computing device 102 can implement multiple parallel instances of a single machine-learned image transformation model 120 (e.g., to perform parallel image transformation across multiple instances of the machine-learned image transformation model).

More particularly, the machine-learned image transformation model 120 can be utilized at the user computing device 102 for image transformation and retrieval in an unsupervised fashion. As an example, a first image and a second image can be obtained at the user computing device 102 (e.g., via the network 180, via image sensor(s) of the user computing device 102, etc.). The first and second images can respectively depict a first object and a second object (e.g., a first face and a second face, etc.). The first and second objects can be of an object type (e.g., a human face object type, etc.), which can include a plurality of object features (e.g., eye features, nose features, mouth features, pose, etc.). The first and second images can be processed with the machine-learned image transformation model 120, which can include a plurality of model channels (e.g., a pre-trained image transformation model 120, etc.). By processing the first and second images, first and second channel mappings can be obtained. The first channel mapping can indicate a mapping between the model channels of the machine-learned image transformation model 120 and the first object features, and the second channel mapping can indicate a mapping between the model channels of the machine-learned image transformation model 120 and the second object features.

Based on the first and second channel mappings, an interpolation vector can be generated using the user computing device 102 for a selected feature of the plurality of object features (e.g., a vector for a nose feature of a face object, etc.). In some implementations, the interpolation vector can be configured to interpolate the selected feature from the first image to the selected feature of the second image (e.g., interpolating the nose feature from the face of the first image to the face of the second image, etc.). Additionally, or alternatively, in some implementations the interpolation vector can be configured to indicate a similarity between the selected feature from the first object and the selected feature from the second object (e.g., indicating a similarity between the nose of the first face and the nose of the second face, etc.). In such fashion, the interpolation vector can be generated for selective, fine-grained image transformation and/or retrieval without necessitating the complex annotation of training datasets.

Additionally, or alternatively, one or more machine-learned image transformation models 140 can be included in or otherwise stored and implemented by the server computing system 130 that communicates with the user computing device 102 according to a client-server relationship. For example, the machine-learned image transformation models 140 can be implemented by the server computing system 130 as a portion of a web service (e.g., an image transformation and/or image retrieval service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. As another example, the user computing device 102 can include one or more image sensors (e.g., smartphone camera sensors, etc.) that are configured to capture images (e.g., the first image, the second image, etc.).

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned image transformation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-4C.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned image transformation models 120 and/or 140 based on a set of training data 162. Alternatively, in some implementations, machine-learned image transformation models 120 and/or 140 can be or otherwise include pre-trained image transformation models. For example, machine-learned image transformation models 120 and/or 140 can be or otherwise include pre-trained image transformation model(s) configured to perform image transformation tasks (e.g., interpolation of a feature from a first image to a second image, etc.). In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
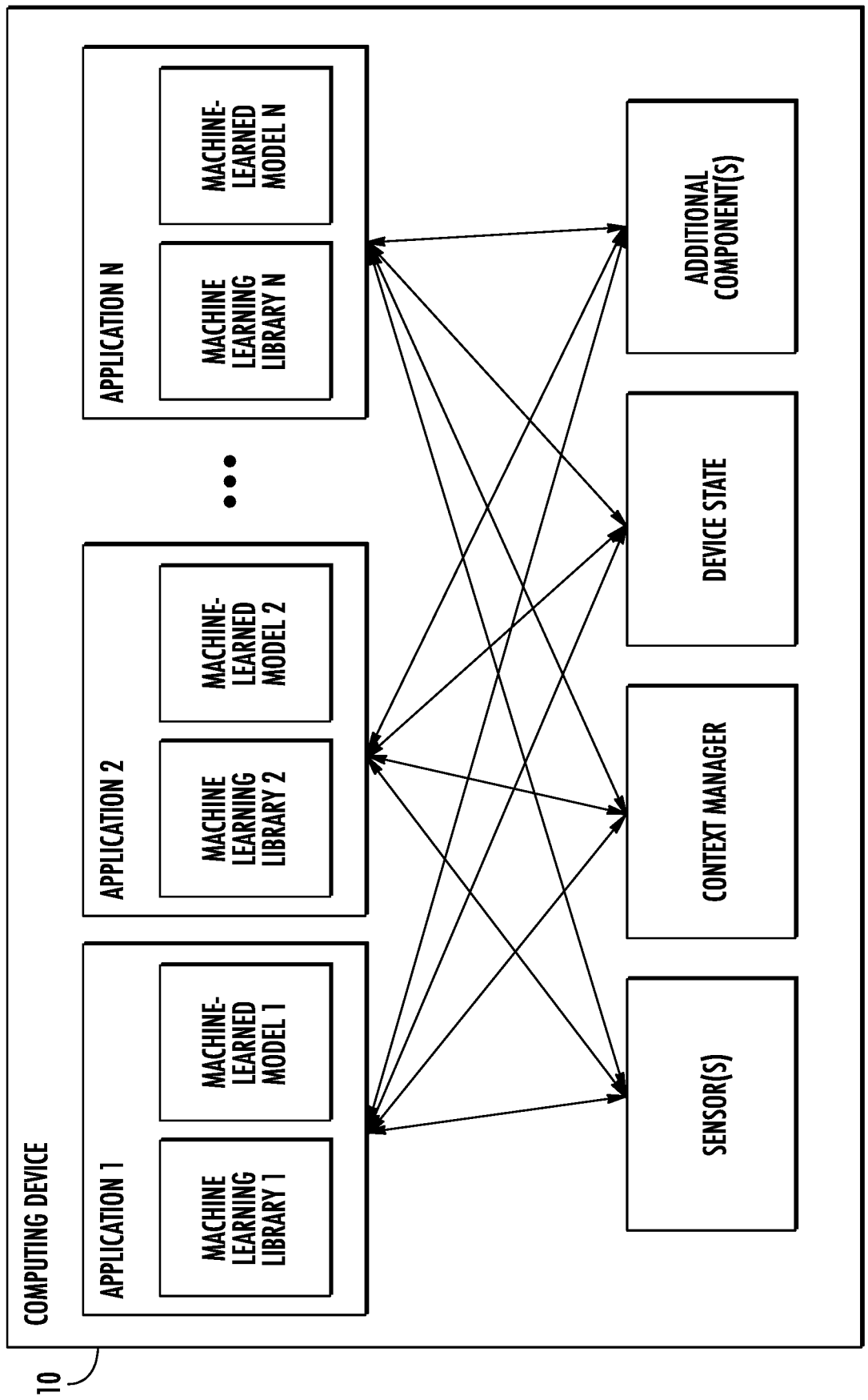
FIG. 1B depicts a block diagram of an example computing device that performs image transformation and/or image retrieval according to example embodiments of the present disclosure.

FIG. 1B depicts a block diagram of an example computing device 10 that performs image transformation and/or image retrieval according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
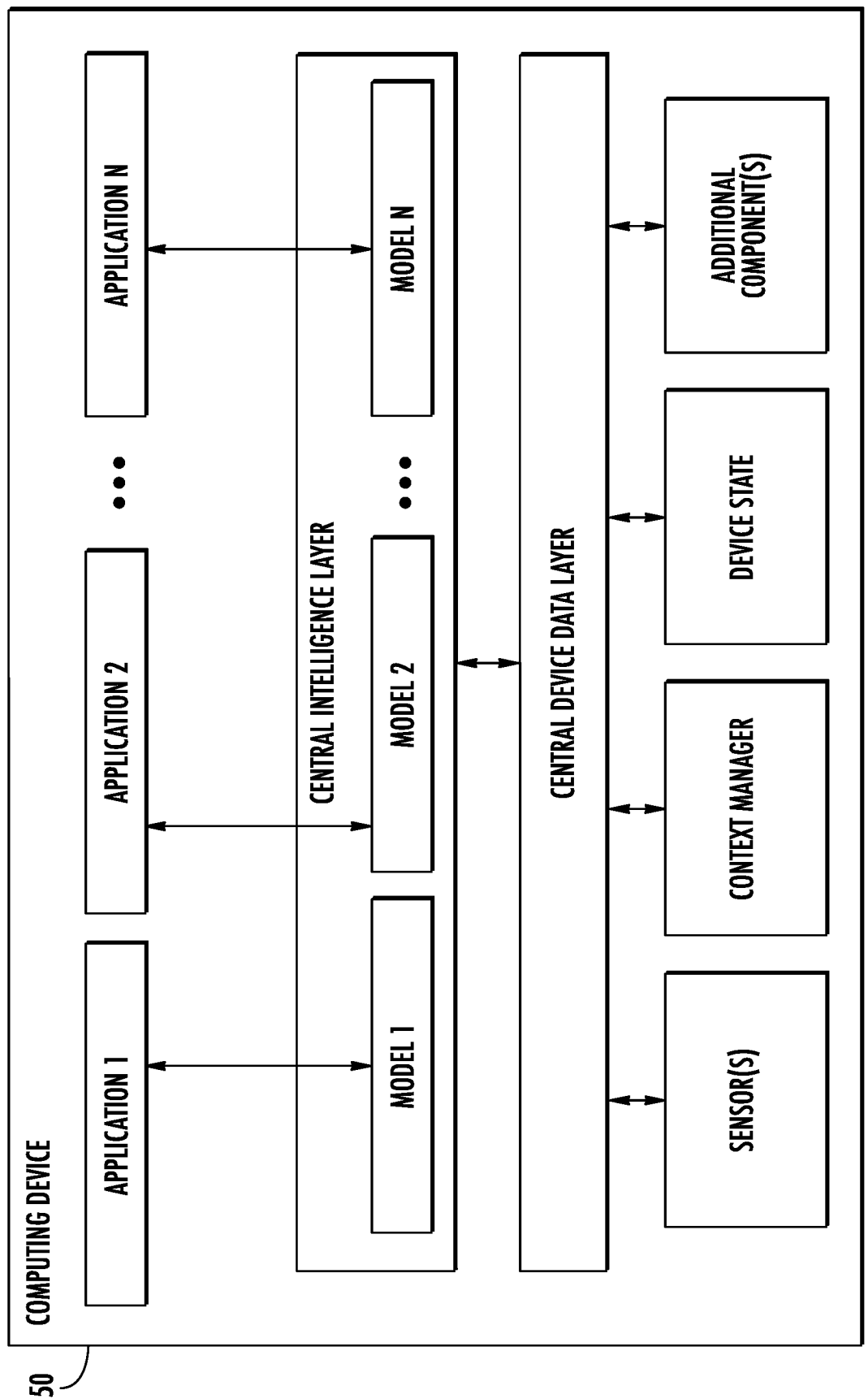
FIG. 1C depicts a block diagram of an example computing device that performs training and/or utilization of a machine-learned image transformation model according to example embodiments of the present disclosure.

FIG. 1C depicts a block diagram of an example computing device 50 that performs training and/or utilization of a machine-learned image transformation model according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
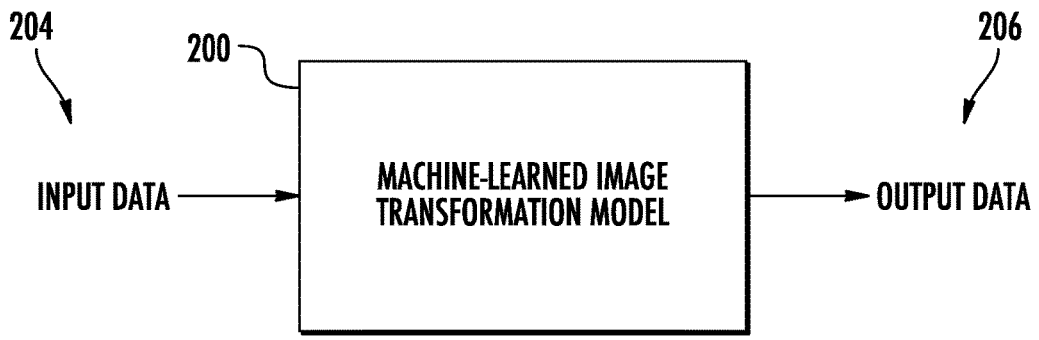
FIG. 2 depicts a block diagram of an example machine-learned image transformation model according to example embodiments of the present disclosure.

FIG. 2 depicts a block diagram of an example machine-learned image transformation model 200 according to example embodiments of the present disclosure. In some implementations, the machine-learned image transformation model 200 is trained to receive a set of input data 204 descriptive of an image that depicts an object including a plurality of object features. Additionally, the input data 204 can include a first feature set for the plurality of object features. As a result of receipt of the input data 204, the machine-learned image transformation model 200 can provide output data 206 that includes a channel mapping indicative of a mapping between a plurality of channels of the machine-learned image transformation model 200 and a feature set of the first image.

Figure 3:
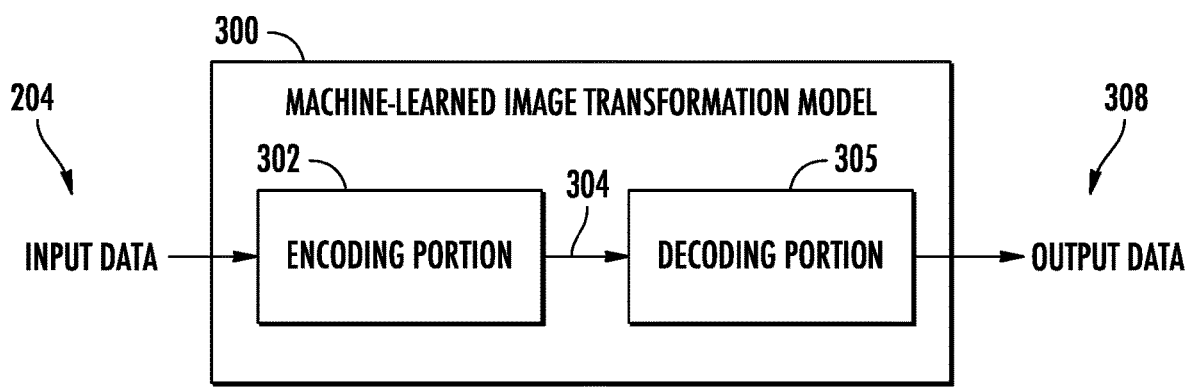
FIG. 3 depicts a block diagram of an example machine-learned image transformation model according to example embodiments of the present disclosure.

FIG. 3 depicts a block diagram of an example machine-learned image transformation model 300 according to example embodiments of the present disclosure. The machine-learned image transformation model 300 is similar to machine-learned image transformation model 200 of FIG. 2 except that machine-learned image transformation model 300 further includes an encoding portion 302 and a decoding portion 306.

More particularly, the encoding portion 302 of the machine-learned image transformation model 300 can process the image data 204 to obtain output data 304. The output data 304 can include the channel mapping as described with regards to FIG. 2. Additionally, the output data 304 can include an embedding of the image included in the input data 204. The decoding portion 305 of the machine-learned image transformation model 300 can process the embedding included in the output data 304 to generate output data 308, which can include a transformation of the image included in the input data 204.

Figure 4A:
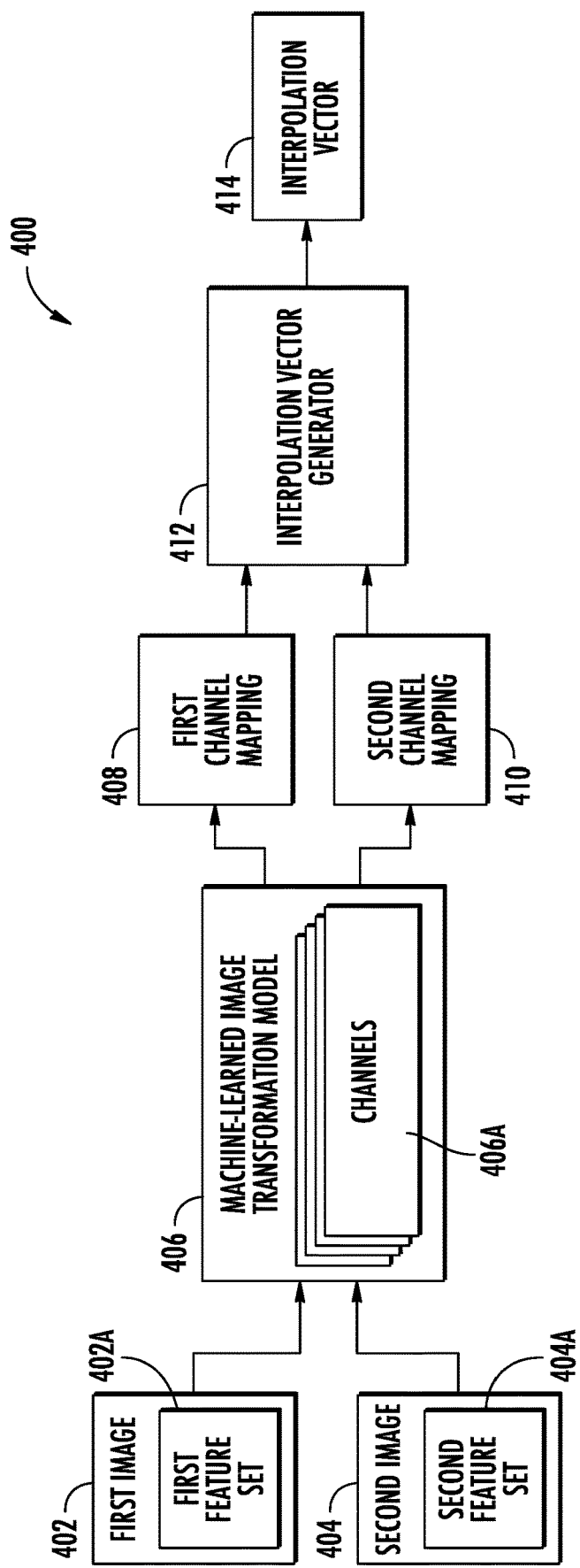
FIG. 4A depicts a data flow diagram for generating an interpolation vector according to example embodiments of the present disclosure.

FIG. 4A depicts a data flow diagram 400 for generating an interpolation vector according to example embodiments of the present disclosure. More particularly, a first image 402 and a second image 404 can be obtained. The first image 402 can depict a first object of an object type (e.g., a human face, a room that includes furniture, a vehicle, etc.), and the second image 404 can depict a second object of the object type. As an example, the first object may be a first face of a human face object type and the second object can be a second human face of the human face object type. As another example, the first object may be a pickup truck of a vehicle object type and the second object may be a sedan of the vehicle object type. The object type can include a plurality of object features. As an example, a human face object type can include a plurality of facial features (e.g., eye feature(s), nose feature(s), mouth feature(s), feature(s) for a region including a portion of the face, hair feature(s), pose feature(s), head shape feature(s), etc.). As another example, a vehicle object type can include a plurality of vehicular features (e.g., roof feature(s), wheel feature(s), vehicle shape feature(s), cabin feature(s), etc.). As another example, a room object type can include a plurality of room features (e.g., furniture feature(s), wall feature(s), accessory feature(s), paint feature(s), etc.). As yet another example, a human body object type can include a plurality of body features (e.g., body composition feature(s), body shape feature(s), clothing feature(s), facial feature(s), pose feature(s), etc.). As such, it should be broadly understood that the object type can be any sort of object, and can include any manner of object features that correspond to the object type.

Additionally, the first image 402 can include a first feature set 402A for the plurality of object features of the object type, and the second image 404 can include a second feature set 404A for the plurality of object features of the object type. As an example, the object type of the objects included in first image 402 and the second image 404 can be a human face, and can include a hair color feature. The first feature set 402A for the plurality of object features can include a brown hair color feature. The second feature set 404A for the plurality of object features can include a blonde hair color feature. As such, the feature sets 402A/404A can be or otherwise include a set of features specific to plurality of object features of the object type.

The first image 402 can be processed with a machine-learned image transformation model 406. The machine-learned image transformation model 406 can include a plurality of model channels 406A configured to process images (e.g., first image 402, second image 404, etc.). As an example, the machine-learned image transformation model 406 may include a plurality of model channels 406A that are respectively configured to detect a feature of the plurality of object features. For example, the object can be a human face object that includes a nose feature, an eyes feature, and a mouth feature. The machine-learned image transformation model 406 can include a channel 406A configured to detect nose features, a channel 406A configured to detect eyes features, and a channel 406A configured to detect mouth features. By processing the first image 402, a first channel mapping 408 can be obtained that is indicative of a mapping between the plurality of model channels 406A and the first feature set 402A for the plurality of object features. As an example, the first channel mapping 408 can indicate that two channels from the plurality of model channels 406A are mapped to a nose feature of the first feature set 402A, while three other model channels the plurality of model channels 406A are mapped to a pose feature of the first feature set 402A. Similarly, the second image 404 can be processed with the machine to obtain a second channel mapping 410 that is indicative of a mapping between the plurality of model channels 406A and the second feature set 402B for the plurality of object features.

The interpolation vector generator 412 (e.g., a hardware component and/or software component configured to generate an interpolation vector based on channel mappings, etc.) can generate interpolation vector 414 based at least in part on the first channel mapping 408 and the second channel mapping 410. The interpolation vector 414 can be generated for a selected feature from the plurality of object features. In some implementations, the interpolation vector 414 can be configured to interpolate the selected feature of the plurality of object features from the first feature set 402A for the plurality of object features to the second feature set 404A. Additionally, or alternatively, in some implementations, the interpolation vector 414 can indicate a similarity between the selected feature from the first object of the first image 402 and the selected feature from the second object of the second image 404.

Figure 4B:
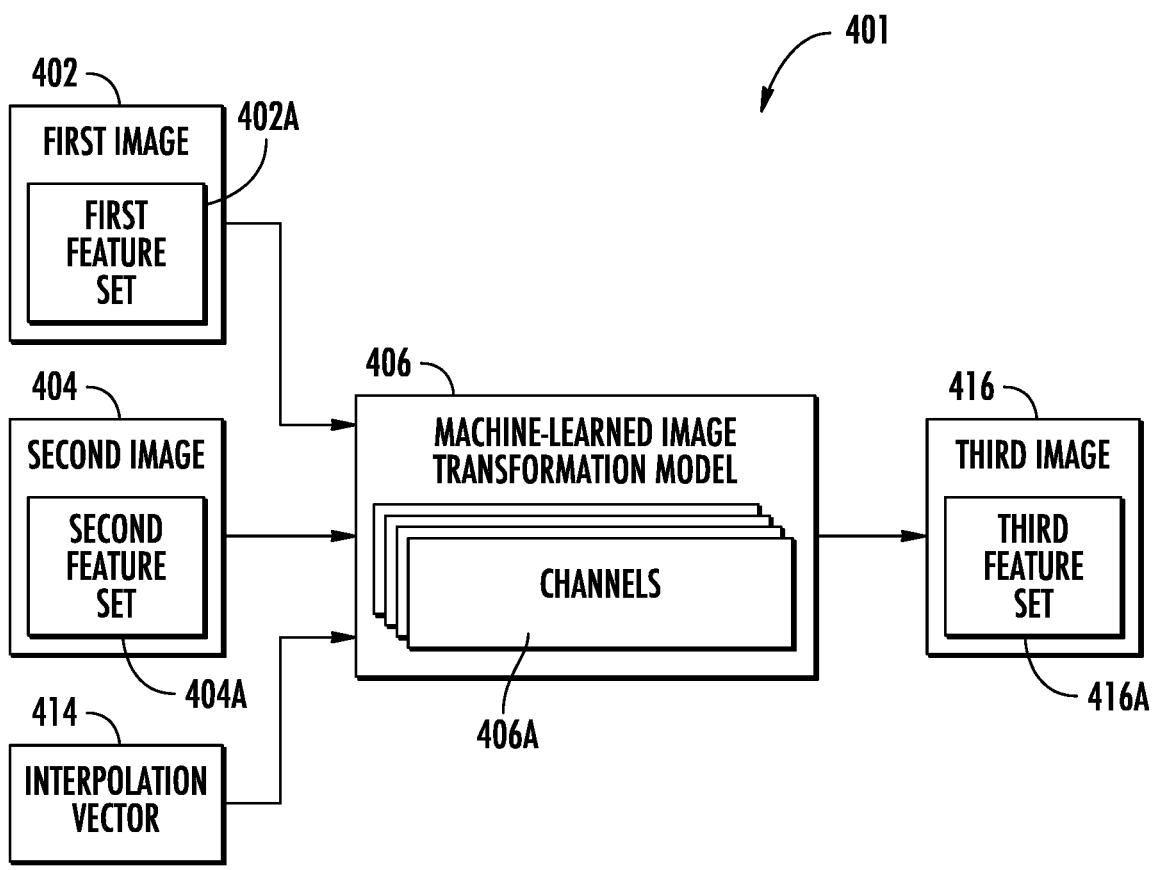
FIG. 4B depicts a data flow diagram for generating a transformed image with interpolated features according to example embodiments of the present disclosure.

FIG. 4B depicts a data flow diagram 401 for generating a transformed image with interpolated features according to example embodiments of the present disclosure. The interpolation vector 414 $q_k$ can be generated for a specific feature k of the plurality of object features K, which correspond to the first feature set 402A of first image 402 and the second feature set 402B of second image 404. The interpolation vector 414 $q_k$ can then be utilized as a mask for k that allows interpolation between the first feature set 402A $\sigma^R$ and the second feature set 404A $\sigma^S$. The interpolation vector 414 $q_k$ can can be utilized to interpolate a selected feature from the first feature set 402A of the first image 402 to the second feature set 404B of the second image 404 by processing the first image 402, the second image 404, and the interpolation vector 414 with the machine-learned image transformation model 406 to obtain an interpolated third image 416. The third image 416 can depict a third object of the object type, and can include a third feature set 416A for the plurality of object features. The third feature set 416A can include the selected feature from the first feature set 402A and one or more features from the second feature set 404A for the plurality of object features. To follow the previously described example, the third image 416 $\sigma_k^G$ can be obtained by processing the first image 402 (e.g., the first feature set 402A $\sigma^R$, etc.), the second image 404 (e.g., the second feature set 404A $\sigma^S$, etc.) and the interpolation vector 414 $q_k$ with the machine-learned image transformation model 406 as represented by:

$$\sigma_k^G = (1-q_k) \odot \sigma^S + q_k \odot \sigma^R$$

In some implementations, the object type can be a human face object type, and the selected feature can be a pose feature. As an example, the first image 402 (e.g., the reference image, etc.) can depict a human face at a pose in which the face is looking to the left side of the image, and the second image 404 (e.g., the source image, etc.) can depict a human face at a pose in which the face is looking to the right side of the image. The interpolation vector 414 can map the model channel(s) 406A of the machine-learned image transformation model 406 that correspond to the pose feature. For example, the interpolation vector may map the first 4 layers of the machine-learned image transformation model 406 (e.g., 2048 style coefficient channels, etc.) to the pose feature $q_{pose}$ and a hair feature $q_{hair}$. For these 4 layers, data for the pose feature can be derived as represented by:

$$q_{pose} = 1 - q_{hair}$$

for the first 4 layers, while the rest of the model channels 406A of the machine-learned image transformation model 406 are zeroed out or otherwise ignored. In such fashion, the pose feature of the first feature set 402A (e.g., the reference image) can be interpolated to be the pose feature of the second feature set 404A without interpolation of any other features of the first feature set 402A to generate the third image 416 that depicts a third object with a third feature set 416A. The third object can include the pose of the first feature set 402A (e.g., looking to the left side of the image) instead of the pose of the second feature set 404A (e.g., looking to the right side of the image, etc.) while maintaining the other features of the second feature set for the plurality of object features within the third feature set 416A (e.g., eye features, mouth features, nose features, etc.).

Figure 4C:
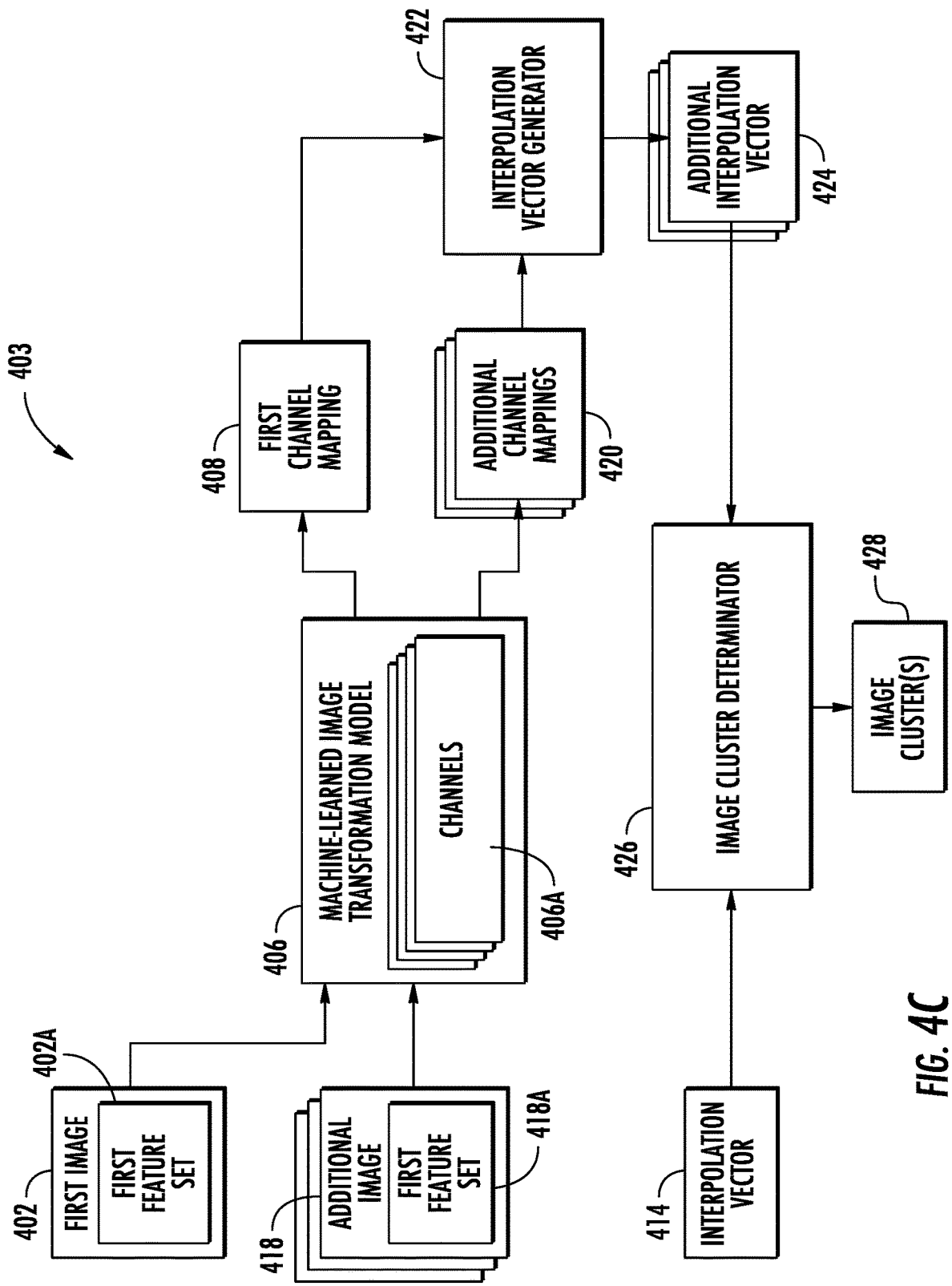
FIG. 4C depicts a data flow diagram for clustering a plurality of images according to example embodiments of the present disclosure.

FIG. 4C depicts a data flow diagram 403 for clustering a plurality of images according to example embodiments of the present disclosure. More particularly, first image 402 can be processed with the machine-learned image transformation model 406 to obtain the first channel mapping as previously described with regards to FIG. 4A. The interpolation vector 414 can be based at least in part on the first channel mapping 408 as previously described with regards to FIG. 4A.

A plurality of additional images 418 can be obtained. Each of the additional images 418 can depict a respective plurality of objects of the object type (e.g., the type of first image 402, etc.). Additionally, the additional images 418 can include feature sets 418A for the plurality of object features. For each of the plurality of additional images 418, a respective additional image 418 can be processed with the machine-learned image transformation model 406 to obtain a respective plurality of additional channel mapping 420. The plurality of additional channel mappings 420 can be indicative of mappings between the plurality of model channels 406A and the feature sets 418A of the additional images 418.

The first channel mapping 408 (e.g., a query mapping, etc.) and each of the additional channel mappings 420 can be processed with the interpolation vector generator 422 to obtain a respective plurality of additional interpolation vectors 424 for the plurality of additional channel mappings 420. More particularly, the representations $v_k^R = q_k^R \odot \sigma^R$ can be computed where $\sigma^R \in \Sigma$ and $\Sigma$ are the style coefficients for the images of the plurality of additional images 418 $\mathcal{X}$. The distance between the features of the first image 402 and each of the additional images 418 can be defined as:

$$\text{Distance}_k(I^Q, I^R) = d(v_k^Q, v_k^R)$$

where d can represent the additional interpolation vectors 424, which each can indicate a distance metric.

To cluster the images, the image cluster determinator can receive the interpolation vector 414 and the additional interpolation vectors 424, and can rank the vectors 414/424 for nearest neighbor search for feature k. For example, an additional interpolation vector 424 can be generated for the first image 402 and a particular additional image 418. If there is a $M_k$ and consequently, a $q_k$ mismatch between the first image 402 and the particular additional image 418, the distance indicated by the additional interpolation vector 424 will be large. As discussed previously, similar features can generally express similar $M_k$. As such, it follows that smaller distance under the distance metric d of the additional interpolation vectors 424 will reflect more similar features. By ranking the additional interpolation vectors 424 by their respective distances, the image cluster determinator 426 can cluster the first image 402 and the additional images 418 in image cluster(s) 428.

As an example, the selected feature can be or otherwise include a hair feature for a human face object type. The plurality of additional images can depict a respective plurality of human face object types. The additional interpolation vectors can be generated for each of the additional images. Based on the additional interpolation vectors, the additional images can be clustered to obtain one or more submembership clusters. Each of the one or more submembership clusters can be associated with an aspect of the selected feature. For example, a submembership cluster can be associated with a blonde color aspect of the selected hair feature. As another example, a submembership cluster can be associated with a long length aspect of the selected hair feature. As yet another example, a submembership cluster can be associated with a frizzled texture aspect of the selected hair feature.

It should be noted that the submembership cluster can be associated with any particular aspect of a selected feature. For example, aspects of a mouth feature can include lipstick aspects, mouth size aspects, mouth positioning aspects, etc. For another example, aspects of an eyes feature can include color aspects, positioning aspects, eye spacing aspects, eye size aspects, etc. For yet another example, aspects of a vehicle shape feature can include color aspects, a reflectance aspect, wheel spacing aspects, tire offset aspects, height aspects, width aspects, profile aspects, etc. As such, it should be broadly understood that the aspects of a selected feature can be or otherwise include any describable aspect of the selected feature.

Figure 5:
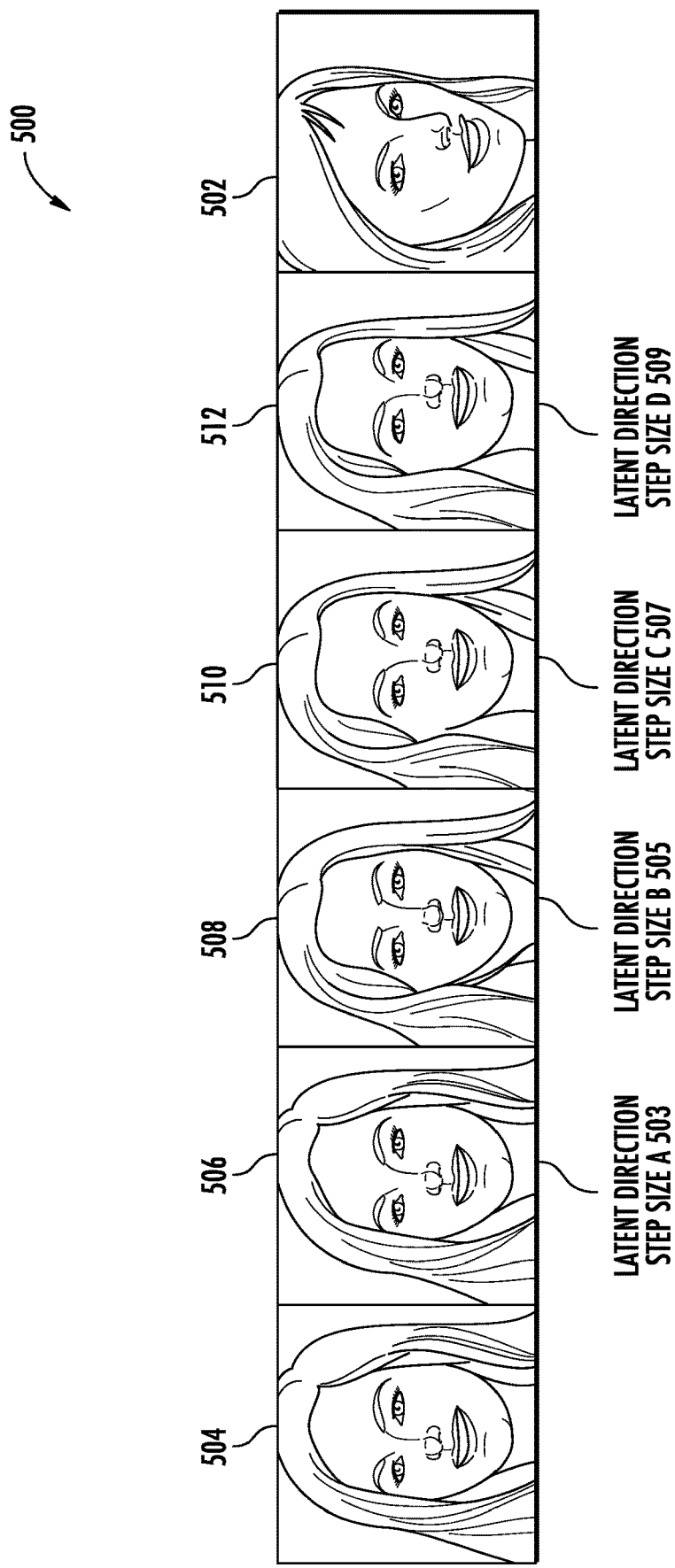
FIG. 5 depicts an example latent direction image transformation according to example embodiments of the present disclosure.

FIG. 5 depicts an example latent direction image transformation 500 according to example embodiments of the present disclosure. More particularly, source image 504 and reference image 502 can be interposed such that the pose feature of reference image 502 can be interpolated to the pose of source image 504. As depicted, the interpolation of features from the feature set of the reference image to the feature set of the source image using an interpolation vector can be formulated as a latent direction. The formulation as a latent direction can be formulated as:

$$\sigma_k^G = \sigma^S + \alpha q_k \odot (\sigma^R - \sigma^S)$$

where the latent direction can be represented as $n = q_k \odot (\sigma^R - \sigma^S)$ and the scalar step can be represented as $\alpha$. In some implementations, if scalar step $\alpha$ is restricted such that $\alpha \in [0,1]$, a style interpolation will be performed. More particularly, under the property of vector arithmetic, $\alpha \in \mathbb{R}$ can be utilized to allow for style extrapolation (e.g., smooth pose interpolation, etc.).

As an example, the latent direction step size A 503 can be set at a relatively low step size (e.g., 0.25, etc.) to facilitate a relatively low interpolation of the pose feature from reference image 502 to source image 504. In such fashion, the level of feature interpolation applied to the source image 504 can be adjusted to latent direction step size A 503, which can implement a relatively minor pose feature transformation to generate transformed image 506. As another example, the latent direction step size B 505 can be set at a moderate step size (e.g., 0.5, etc.) to facilitate a moderate interpolation of the pose feature from reference image 502 to source image 504. As another example, the latent direction step size C 507 can be set at a relatively high step size (e.g., 0.75, etc.) to facilitate a relatively high interpolation of the pose feature from reference image 502 to source image 504. As yet another example, the latent direction step size D 509 can be set at a full step size (e.g., 1.0, etc.) to facilitate a full interpolation of the pose feature from reference image 502 to source image 504.

Figure 6:
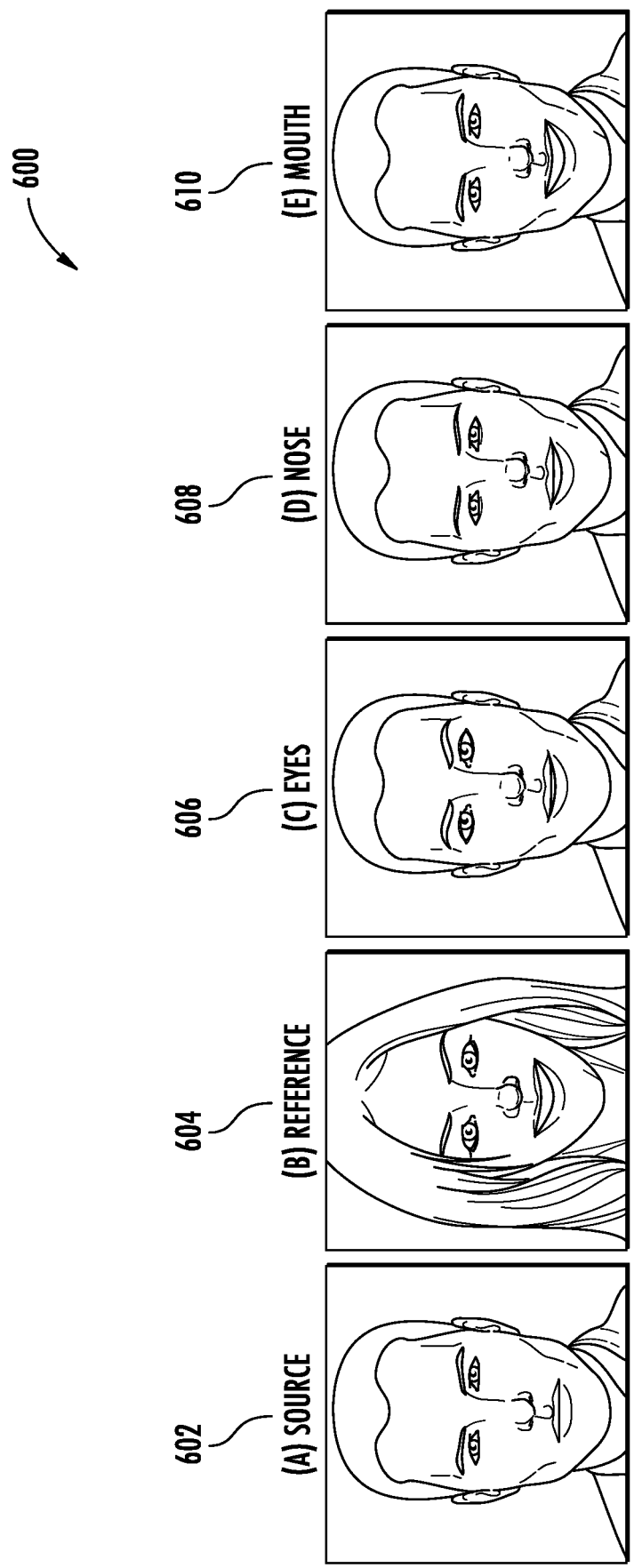
FIG. 6 depicts an example image transformation with pose interpolation from a reference image to a source image according to example embodiments of the present disclosure.

FIG. 6 depicts an example image transformation 600 with pose interpolation from a reference image to a source image according to example embodiments of the present disclosure. More particularly, one or more features can be interpolated from a reference image 604 to a source image 602. As an example, an interpolation vector can be generated as previously described with regards to FIG. 4A. The interpolation vector can be processed alongside the source image 602 and the 604 to interpolate one or more features from the reference image to the source image. As an example, the interpolation vector can be generated for a selected eyes feature. The vector can be processed alongside images 602 and 604 to generate transformed image 606, which includes the eye features of reference image 604 and the remaining features of source image 602.

As another example, the interpolation vector can be generated for a selected nose feature. The vector can be processed alongside images 602 and 604 to generate transformed image 608, which includes the nose features of reference image 604 and the remaining features of source image 602. As yet another example, the interpolation vector can be generated for a selected mouth feature. The vector can be processed alongside images 602 and 604 to generate transformed image 610, which includes the mouth features of reference image 604 and the remaining features of source image 602. In such fashion, the interpolation vector can be selectively utilized to facilitate an efficient, high-quality interpolation of one or more features from a reference image to a source image while retaining the remaining features of the source image.

Figure 7:
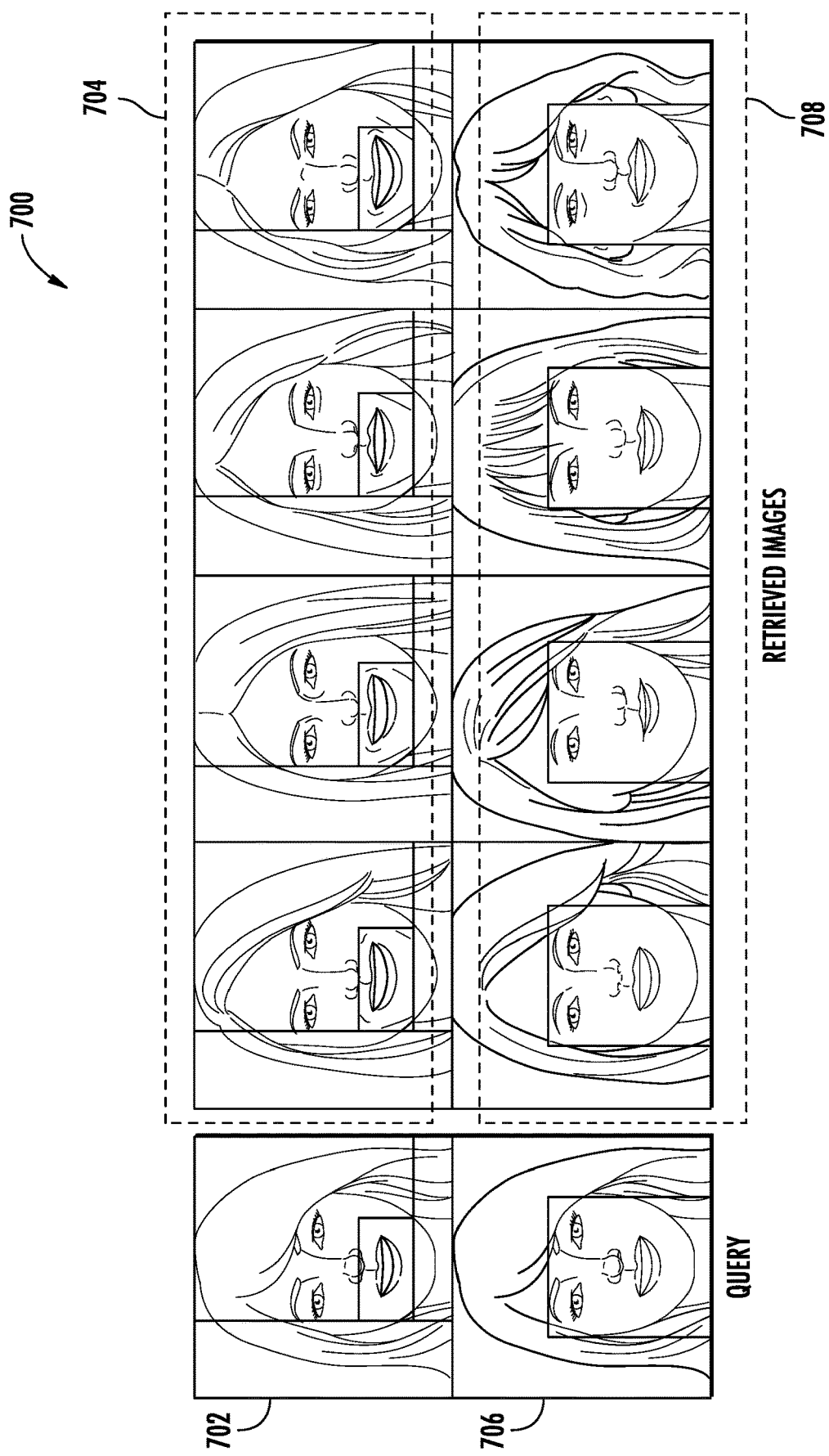
FIG. 7 depicts an example image retrieval based on feature-channel mapping according to example embodiments of the present disclosure.

FIG. 7 depicts an example image retrieval 700 based on feature-channel mapping according to example embodiments of the present disclosure. More particularly, a channel mapping can be generated using a machine-learned image transformation model for the query image 702. Additional channel mappings can be generated similarly for a plurality of additional images (e.g., result images 704, etc.). An interpolation vector can be generated for each of the additional images based on the first channel mapping and a respective channel mapping of each of the additional images. The interpolation vectors can indicate a similarity between a selected feature of the query image 702 and the additional images. To follow the depicted example, the selected feature can be a mouth feature of a human face object type. Result images 704 can be retrieved based on the similarity indicated by their respective interpolation vectors. In such fashion, the interpolation vector generated for the additional images can be utilized to retrieve result images 704 with a substantially similar feature appearance to the query image 702.

Similarly, a channel mapping can be generated for query image 706. Interpolation vectors can be generated for each of the additional images based on the channel mappings of the query image 706 and the additional images. Unlike the interpolation vector generated for query image 702, the interpolation vector generated for query image 706 can be generated for the mouth feature of a human face object type. Result images 708 can be retrieved based on the feature similarity indicated by their respective interpolation vectors.

Example Methods

Figure 8:
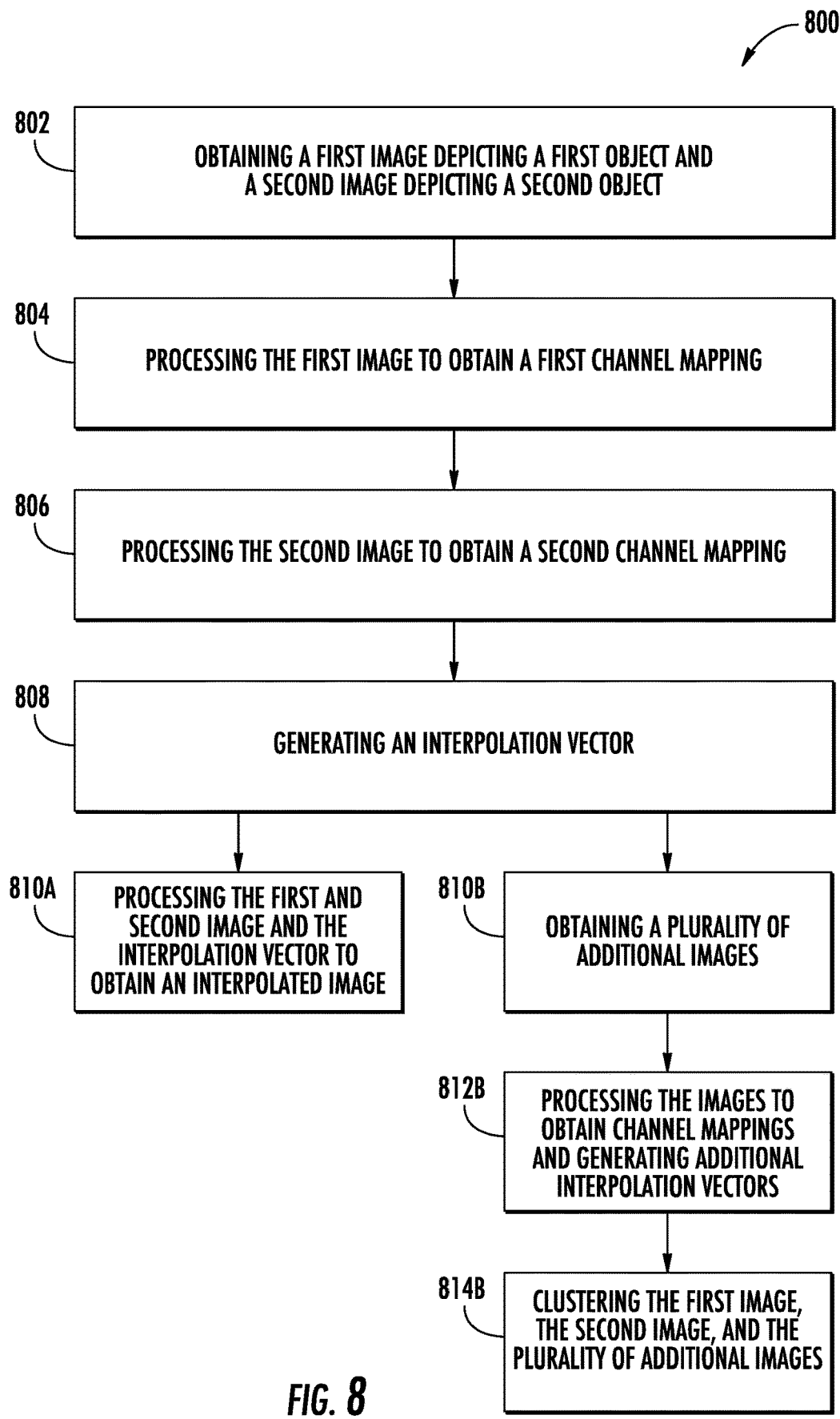
FIG. 8 depicts a flow chart diagram of an example method to perform generation and utilization of an interpolation vector according to example embodiments of the present disclosure.

FIG. 8 depicts a flow chart diagram of an example method 800 to perform generation and utilization of an interpolation vector according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a first image depicting a first object and a second image depicting a second object. More particularly, the computing system can obtain a first image and a second image. The first image can depict a first object of an object type (e.g., a human face, a room that includes furniture, a vehicle, etc.), and the second image can depict a second object of the object type. As an example, the first object may be a first face of a human face object type and the second object can be a second human face of the human face object type. As another example, the first object may be a pickup truck of a vehicle object type and the second object may be a sedan of the vehicle object type. The object type can include a plurality of object features. As an example, a human face object type can include a plurality of facial features (e.g., eye feature(s), nose feature(s), mouth feature(s), feature(s) for a region including a portion of the face, hair feature(s), pose feature(s), head shape feature(s), etc.). As another example, a vehicle object type can include a plurality of vehicular features (e.g., roof feature(s), wheel feature(s), vehicle shape feature(s), cabin feature(s), etc.). As another example, a room object type can include a plurality of room features (e.g., furniture feature(s), wall feature(s), accessory feature(s), paint feature(s), etc.). As yet another example, a human body object type can include a plurality of body features (e.g., body composition feature(s), body shape feature(s), clothing feature(s), facial feature(s), pose feature(s), etc.). As such, it should be broadly understood that the object type can be any sort of object, and can include any manner of object features that correspond to the object type.

At 804, the computing system can process the first image to obtain a first channel mapping. More particularly, the computing system can process the first image with a machine-learned image transformation model. The machine-learned image transformation model can include a plurality of model channels. As an example, the machine-learned image transformation model may include a plurality of channels that are respectively configured to detect a feature of the plurality of object features. For example, the object can be a human face object that includes a nose feature, an eyes feature, and a mouth feature. The machine-learned image transformation model can include a channel configured to detect nose features, a channel configured to detect eyes features, and a channel configured to detect mouth features. By processing the first image, a first channel mapping can be obtained that is indicative of a mapping between the plurality of model channels and the first feature set for the plurality of object features. As an example, the first channel mapping can indicate that two channels from the plurality of model channels are mapped to a nose feature of the first feature set, while three other model channels the plurality of model channels are mapped to a pose feature of the first feature set. Alternatively, in some implementations, each model channel of the plurality of model channels can be mapped to a single respective feature of the plurality of features As a more particular example, conventional transformation models generally assume that the channels of models that make high contributions for particular feature(s) are always the same for each image that includes an object of a specific object type. For example, conventional models assume that for each image including a human face, the channels that contribute to the eyes feature(s) of the face will be the same for each image of a face. Based on this assumption, conventional models generally generate channel contribution scores for a large collection of images N, and then average the scores. However, this conventional method ignores the significant variance in high contribution channels between images. More particularly, averaging contribution scores over a large number of images N can destroy feature aspects that are specific to source images and reference images, therefore significantly reducing the quality of image transformations, while also necessitating the significantly inefficient processing of the large number of images N. As such, systems and methods of the present disclosure instead process a source image (e.g., the first image, etc.), and a reference image (e.g., the second image, etc.), therefore avoiding the computational inefficiencies and reduction in quality inherent to conventional image transformation techniques.

More particularly, it can be assumed that performance of k-means clustering over a specific feature of a plurality of images of the same object type (e.g., clustering over hair $M_{hair}$ (N=1) for images that depict a human face object type, etc.) can lead to semantically meaningful clusters of images. As such, it can also be assumed that the top active model channels for each image cluster are unique to the feature associated with the image cluster. Therefore, high contribution model channels for a specific semantic feature are not common across images, and instead can include multiple rich semantic meanings. More particularly, within each feature k, there can be multiple subgroups that each image can belong to. As such, unlike conventional models which process a large number of images N and average contribution scores, systems and methods of the present disclosure can facilitate more accurate, more efficient, and more realistic image transformation and/or retrieval by processing channel mappings for only the source image and the reference image N=2 (e.g., the first image, the second image, etc.).

As an example, the machine-learned image transformation model can process the first image (e.g., a reference image r, etc.) to obtain first channel mapping $\Sigma_{h,w} A[r]_{c,h,w}^2 \odot U[r]_{k,h,w}$, where $A \in \mathbb{R}^{C \times H \times W}$ can be the activation tensor at a particular layer of the machine-learned image transformation model, and C can represent the number of channels, H can represent the height, and W can represent the width. Additionally, each spatial location of A can be associated with cluster memberships $U \in \{0,1\}^{K \times H \times W}$. Intuitively, the first channel mapping can indicate how much the c-th channel of style coefficients $\sigma \in \mathbb{R}^C$ can contribute to the generation for a certain feature k of the first feature set of the plurality of object features. It should be noted that in some implementations, $\sigma$ can directly scale the activations A in the modulation module, thus, the larger the activations, the more k is affected by the channel c.

At 806, the computing system can process the second image to obtain a second channel mapping. More particularly, the computing system can process the second image (e.g., a source image s, etc.) with the machine-learned image transformation model to obtain second channel mapping $\Sigma_{h,w} A[s]_{c,h,w}^2 \odot U[s]_{k,h,w}$, which can be represented in the same manner as previously discussed with regards to the first channel mapping, and can be indicative of a mapping between the plurality of model channels and the second feature set for the plurality of object features. More particularly, the second channel mapping can indicate how much the c-th channel of style coefficients $\sigma \in \mathbb{R}^C$ can contribute to the generation for a certain feature k of the second feature set of the plurality of object features.

At 808, the computing system can generate an interpolation vector. More particularly, the computing system can generate an interpolation vector for a selected feature of the plurality of object features based at least in part on the first channel mapping and the second feature mapping. In some implementations, an additional channel mapping can be determined based on the first channel mapping and the second channel mapping as represented by:

$$M_{k,c} = \max\left(\sum_{h,w} A[s]_{c,h,w}^2 \odot U[s]_{k,h,w}, \sum_{h,w} A[r]_{c,h,w}^2 \odot U[r]_{k,h,w}\right)$$

Where $M_{k,c}$ can represent the additional channel mapping. In some implementations, each channel of the plurality of model channels can correspond to a respective object feature of the plurality of object features. A soft class assignment for each feature channel can be obtained based on a softmax of all features, as represented by:

$$q = Softmax_k\left(\frac{M}{\tau}\right),$$

where $M \in [0,1]^{K \times C}$ can represent the stacked contribution score of all of the plurality of object features, $\tau$ can represent the temperature, and $q \in [0,1]^{K \times C}$ can represent the interpolation vector. The interpolation vector for a particular feature k, $q_k$ can be indexed from the row of q. As such, in some implementations, the generated interpolation vector $q \in [0,1]^{K \times C}$ can include a separate interpolation vector $q_k$ for each object feature k of the plurality of object features K. Alternatively, in some implementations, the interpolation vector can be generated as $q_k$ for a selected feature k of the plurality of object features K.

At 810A, the computing system can, in some implementations, process the first and second image and the interpolation vector to obtain an interpolated image. More particularly, in some implementations, the interpolation vector can be configured to interpolate the selected feature of the plurality of object features from the first feature set for the plurality of object features to the second feature set for the plurality of object features. To follow the previous examples, the interpolation vector $q_k$ can be generated for a specific feature k. The interpolation vector $q_k$ can then be utilized as a mask for k that allows interpolation between the first feature set $\sigma^R$ and the second feature set $\sigma^S$. In some implementations, the interpolation vector $q_k$ can can be utilized to interpolate the selected feature from the first feature set to the second feature set by processing the first image, the second image, and the interpolation vector with the machine-learned image transformation model to obtain an interpolated image. The interpolated image can depict a third object of the object type that includes a third feature set for the plurality of object features. The third feature set can include the selected feature from the first feature set and one or more features from the second feature set. To follow the previously described example, the third image $\sigma_k^G$ can be obtained by processing the first image (e.g., the first feature set $\sigma^R$, etc.), the second image (e.g., the second feature set $\sigma^S$, etc.) and the interpolation vector $q_k$ with the machine-learned image transformation model as represented by:

$$\sigma_k^G = (1-q_k) \odot \sigma^S + q_k \odot \sigma^R$$

In some implementations, the object type can be a human face object type, and the selected feature can be a pose feature. As an example, the first image (e.g., the reference image, etc.) can depict a human face at a pose in which the face is looking to the left side of the image, and the second image (e.g., the source image, etc.) can depict a human face at a pose in which the face is looking to the right side of the image. The interpolation vector can map the model channel (s) of the machine-learned image transformation model that correspond to the pose feature. For example, the interpolation vector may map the first 4 layers of the machine-learned image transformation model (e.g., 2048 style coefficient channels, etc.) to the pose feature $q_{pose}$ and a hair feature $q_{hair}$. For these 4 layers, data for the pose feature can be derived as represented by:

$$q_{pose} = 1 - q_{hair}$$

for the first 4 layers, while the rest of the model channels of the machine-learned image transformation model are zeroed out or otherwise ignored. In such fashion, the pose feature of the first feature set (e.g., the reference image) can be interpolated to be the pose feature of the second feature set without interpolation of any other features of the first feature set to generate a third image that depicts a third object. The third object can include the pose of the first feature set (e.g., looking to the left side of the image) instead of the pose of the second feature set (e.g., looking to the right side of the image, etc.) while maintaining the other features of the second feature set for the plurality of object features (e.g., eye features, mouth features, nose features, etc.).

Similarly, data for a feature different than the pose feature can be derived in the same manner. To follow the previous example, to derive the data for the feature, the model channels of the first 4 layer(s) mapped to the hair and pose features can be zeroed out or otherwise ignored. It should be noted that by transferring pose feature(s) using the interpolation vector, systems and methods of the present disclosure obviate the need for data labeling or manual tuning of parameters and/or hyperparameters; processes that are required by conventional image transformation techniques for pose interpolation. As such, the systems and methods of the present disclosure represent a significant increase in efficiency in comparison to conventional methods, and furthermore substantially reduce the computational resources required to facilitate pose transfer for image transformation (e.g., processing cycles, memory, storage, power, etc.).

At 810B, the computing system can, in some implementations, obtain a plurality of additional images. More particularly, the computing system can obtain a plurality of additional images. Each of the plurality of images can depict a respective plurality of objects of the object type. Additionally, each of the additional can include a feature set for the plurality of object features.

At 812B, the computing system can, in some implementations, process the additional images to obtain channel mappings and generate additional interpolation vectors. More particularly, the computing system can, for each of the plurality of additional images, process a respective additional image with the machine-learned image transformation model to obtain a respective channel mapping. The respective channel mapping can be indicative of a mapping between the plurality of model channels and the feature set of the respective additional image.

In some implementations, for each of the plurality of additional images, an additional interpolation vector can be generated based at least in part on the first channel mapping and the respective channel mapping. More particularly, the representations $v_k^R = q_k^R \odot \sigma^R$ can be computed where $\sigma^R \in \Sigma$ and $\Sigma$ are the style coefficients for the images of the plurality of additional images $\mathcal{X}$.

At 814B, the computing system can cluster the first image, the second image, and the plurality of additional images. More particularly, in some implementations, the interpolation vector can be configured to be indicative of a similarity between the selected feature from the first feature set and the selected feature from the second feature set (e.g., a similarity between a hair feature of the first feature set and the hair feature of the second feature set, etc.). For example, given a retrieval dataset $\mathcal{X}$, the interpolation vector can be utilized to retrieve the top-k closest images $\mathcal{T} \subset \mathcal{X}$ with respect to a facial feature (e.g., eye features, etc.). As described previously, the first channel mapping and second channel mapping can be utilized to identify the channels that mediate the various features of a specific object type. As such, the channel mappings, and/or the interpolation vector, can be utilized to retrieve images that depict objects with features (e.g., appearance, etc.) that are similar to the features of the interpolation vector and/or the channel mappings.

As an example, given a feature k, $q_k \in [0,1]^{1 \times C}$ can be encoded, for a particular image, how much that channel contributes to that feature. Since $q_k$ can be considered to be a mask, a feature specific representation can be constructed as represented by:

$$v_k^Q = q_k^Q \odot \sigma^Q.$$

where feature retrieval can be performed by matching $v_k$, as two images with similar $v_k$ suggest a lookalike feature k.

In some implementations, the interpolation of features from the first feature set to the second feature set using the interpolation vector can be formulated as a latent direction. More particularly, the formulation as a latent direction can be formulated as:

$$\sigma_k^G = \sigma^S + \alpha q_k \odot (\sigma^R - \sigma^S)$$

where the latent direction can be represented as $n = q_k \odot (\sigma^R - \sigma^S)$ and the scalar step can be represented as a. In some implementations, if scalar step $\alpha$ is restricted such that $\alpha \in [0,1]$, a style interpolation will be performed. More particularly, under the property of vector arithmetic, $\alpha \in \mathbb{R}$ can be utilized to allow for style extrapolation (e.g., smooth pose interpolation, etc.).

More particularly, the computing system can cluster the images based at least in part on the distances between the images indicated by the additional interpolation vectors. The distance between the features of the two images (e.g., the first image, the second image, the respective additional image, etc.) can be defined as:

$$\text{Distance}_k(I^Q, I^R) = d(v_k^Q, v_k^R)$$

where d can represent a distance metric. The distances can be ranked for nearest neighbor search for facial feature k. For example, if there is a $M_k$ and consequently, a $q_k$ mismatch between two images, their distance will be large. As discussed previously, similar features can generally express similar $M_k$. As such, it follows that smaller distance under the distance metric d will reflect more similar features. In some implementations, interpolation vector and/or query image $\sigma^Q$ and retrieved image $\sigma^R$ can be normalized using layer-wise mean and standard deviation from E. In some implementations, the first image, the second image, and the plurality of additional images can be clustered based at least in part on the interpolation vector and each of the additional interpolation vectors.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generation of interpolation vectors for image transformation, comprising:

obtaining, by a computing system comprising one or more computing devices, a first image depicting a first object of an object type and a second image depicting a second object of the object type, wherein objects of the object type comprise a plurality of object features, and wherein the first object comprises a first feature set for the plurality of object features and the second object comprises a second feature set for the plurality of object features different than the first feature set;

processing, by the computing system, the first image with a machine-learned image transformation model comprising a plurality of model channels to obtain a first channel mapping indicative of a mapping between the plurality of model channels and the first feature set for the plurality of object features;

processing, by the computing system, the second image with the machine-learned image transformation model to obtain a second channel mapping indicative of a mapping between the plurality of model channels and the second feature set for the plurality of object features; and generating, by the computing system based at least in part on the first channel mapping and the second channel mapping, an interpolation vector for a selected feature of the plurality of object features, wherein the interpolation vector is configured to interpolate the selected feature of the plurality of object features from the first feature set for the plurality of object features to the second feature set for the plurality of object features; and processing, by the computing stem, the first image, the second image and the interpolation vector with the machine-learned image transformation model to obtain an interpolated image, wherein the interpolated image depicts a third object of the object type comprising a third feature set for the plurality of object features, wherein the third feature set comprises the selected feature from the first feature set and one or more second features for the second feature set for the plurality of object features.

2. The computer-implemented method of claim 1, wherein:

the interpolation vector is indicative of a similarity between the selected feature from the first object and the selected feature from the second object.

3. The computer-implemented method of claim 2, wherein the method further comprises:

obtaining, by the computing system, a plurality of additional images, wherein the plurality of additional images depict a respective plurality of objects of the object type, wherein each of the respective plurality of objects comprises a feature set for the plurality of object features; and for each of the plurality of additional images:

processing, by the computing system, a respective additional image of the plurality of additional images with the machine-learned image transformation model to obtain a respective channel mapping indicative of a mapping between the plurality of model channels and the feature set of the respective additional image for the plurality of object features; and generating, by the computing system based at least in part on the first channel mapping and the respective channel mapping, an additional interpolation vector for the selected feature of the plurality of object features.

4. The computer-implemented method of claim 3, wherein the method further comprises:

clustering, by the computing system, the first image, the second image, and the plurality of additional images based at least in part on the interpolation vector and each of the additional interpolation vectors to obtain one or more submembership clusters respectively associated with one or more aspects of the selected feature.

5. The computer-implemented method of claim 1, wherein the selected feature comprises one or more selected features selected from the plurality of object features.

6. The computer-implemented method of claim 1, wherein the object type comprises a face, and wherein the plurality of object features comprise one or more of:

one or more eye features;
one or more mouth features;
one or more nose features;
one or more features for a region comprising a portion of the face;
one or more hair features;
one or more pose features; and
one or more head shape features.

7. The computer-implemented method of claim 6, wherein:

the selected feature comprises the one or more pose features,
the plurality of object features comprises the one or more nose features; and
wherein a third object comprises the one or more pose features from the first object and the one or more nose features from the second object.

8. The computer-implemented method of claim 1, wherein the object type comprises a room, and wherein the plurality of object features comprises a plurality of furniture objects.

9. The computer-implemented method of claim 1, wherein the object type comprises a human body, and wherein the plurality of object features comprises one or more of:

one or more clothing items;
one or more body shape features;
one or more facial features; or
one or more body pose features.

10. The computer-implemented method of claim 1, wherein the machine-learned image transformation model comprises an encoding portion, a decoding portion, and a discriminator portion.

11. The computer-implemented method of claim 10, wherein:
the encoding portion of the machine-learned image transformation model is configured to encode an image; and
wherein processing the first image with the machine-learned image transformation model comprises processing, by the computing system, the first image with the encoding portion of the machine-learned image transformation model to obtain an image encoding and the first channel mapping indicative of the mapping between the plurality of model channels and the first feature set for the plurality of object features.

12. The computer-implemented method of claim 10, wherein the machine-learned image transformation model comprises one or more neural networks pre-trained for image transformation tasks.

13. A computing system for generation of interpolation vectors for image transformation and retrieval tasks, comprising:
one or more processors;
a machine-learned image transformation model trained to perform image transformation tasks, wherein the machine-learned image transformation model comprises an encoding portion, a decoding portion, and a plurality of model channels;
one or more tangible, non-transitory, computer readable media that collectively store instructions that when executed by the one or more processors cause the one or more processors to perform operations, the operations comprising:
obtaining a first image depicting a first object of an object type and a second image depicting a second object of the object type, wherein objects of the object type comprise a plurality of object features, and wherein the first object comprises a first feature set for the plurality of object features and the second object comprises a second feature set for the plurality of object features different than the first feature set;
processing the first image with the encoding portion of the machine-learned image transformation model to obtain a first channel mapping indicative of a mapping between the plurality of model channels and the first feature set for the plurality of object features;
processing the second image with the encoding portion of the machine-learned image transformation model to obtain a second channel mapping indicative of a mapping between the plurality of model channels and the second feature set for the plurality of object features;
generating, based at least in part on the first channel mapping and the second channel mapping, an interpolation vector for a selected feature of the plurality of object features, wherein the interpolation vector is configured to interpolate the selected feature of the plurality of object features from the first feature set for the plurality of object features to the second feature set for the plurality of object features; and
processing the first image, the second image, and the interpolation vector with the machine-learned image transformation model to obtain an interpolated image, wherein the interpolated image depicts a third object of the object type comprising a third feature set for the plurality of object features, wherein the third feature set comprises the selected feature from the first feature set and one or more second features for the second feature set for the plurality of object features.

14. The computing system of claim 13, wherein:
the interpolation vector is indicative of a similarity between the selected feature from the first object and the selected feature from the second object; and
wherein the operations further comprise:
obtaining a plurality of additional images, wherein each of the plurality of additional images depicts an object of a respective plurality of objects of the object type, wherein each of the plurality of additional images comprises a plurality of channels; and
for each of the plurality of additional images:
processing a respective additional image of the plurality of additional images with the machine-learned image transformation model to obtain a respective channel mapping indicative of a mapping between the plurality of model channels and the feature set of the respective additional image for the plurality of object features; and
generating, based at least in part on the first channel mapping and the respective channel mapping, an additional interpolation vector for the selected feature of the plurality of object features.

15. The computing system of claim 14, wherein the operations further comprise:
clustering the first image, the second image, and the plurality of additional images based at least in part on the interpolation vector and each of the additional interpolation vectors to obtain one or more submembership clusters respectively associated with one or more aspects of the selected feature.

16. The computing system of claim 13, wherein the object type comprises a face, and wherein the plurality of object features comprise one or more of:
one or more eye features;
one or more mouth features;
one or more nose features;
one or more features for a region comprising a portion of the face;
one or more hair features;
one or more pose features; and
one or more head shape features.

17. A computer-implemented method for generation of interpolation vectors for image transformation and retrieval tasks, comprising:
obtaining, by a computing system comprising one or more computing devices, a first image depicting a first object of an object type and a second image depicting a second object of the object type, wherein objects of the object type comprise a plurality of object features, and wherein the first object comprises a first feature set for the plurality of object features and the second object comprises a second feature set for the plurality of object features different than the first feature set;
processing, by the computing system, the first image with a machine-learned image transformation model comprising a plurality of model channels to obtain a first channel mapping indicative of a mapping between the plurality of model channels and the first feature set for the plurality of object features;
processing, by the computing system, the second image with the machine-learned image transformation model to obtain a second channel mapping indicative of a mapping between the plurality of model channels and the second feature set for the plurality of object features;
generating, by the computing system based at least in part on the first channel mapping and the second channel mapping, an interpolation vector for a selected feature of the plurality of object features;

obtaining, by the computing system, a plurality of additional images, wherein the plurality of additional images depict a respective plurality of objects of the object type, wherein each of the respective plurality of objects comprises a feature set for the plurality of object features; and for each of the plurality of additional images:
processing, by the computing system, a respective additional image of the plurality of additional images with the machine-learned image transformation model to obtain a respective channel mapping indicative of a mapping between the plurality of model channels and the feature set of the respective additional image for the plurality of object features; and generating, by the computing system based at least in part on the first channel mapping and the respective channel mapping, an additional interpolation vector for the selected feature of the plurality of object features.

18. The computer-implemented method of claim 17, wherein the method further comprises:
clustering, by the computing system, the first image, the second image, and the plurality of additional images based at least in part on the interpolation vector and each of the additional interpolation vectors to obtain one or more submembership clusters respectively associated with one or more aspects of the selected feature.

* * * * *